United States Patent
Virnelson et al.

(10) Patent No.: US 9,533,798 B2
(45) Date of Patent: *Jan. 3, 2017

(54) USES OF UV-CURABLE POLYTHIOETHER SEALANTS FOR SEALING FASTENERS AND FOR SMOOTHING SURFACES

(71) Applicant: PRC-DeSoto International, Inc., Sylmar, CA (US)

(72) Inventors: Bruce Virnelson, Valencia, CA (US); Raquel Keledjian, Glendale, CA (US); Renhe Lin, Stevenson Ranch, CA (US); Chandra B. Rao, Valencia, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/659,074

(22) Filed: Oct. 24, 2012

(65) Prior Publication Data

US 2013/0284359 A1 Oct. 31, 2013
US 2016/0304251 A9 Oct. 20, 2016

Related U.S. Application Data

(63) Continuation-in-part of application No. 12/855,729, filed on Aug. 13, 2010, now Pat. No. 8,932,685, and a
(Continued)

(51) Int. Cl.
*C08F 2/48* (2006.01)
*B65D 41/00* (2006.01)
(Continued)

(52) U.S. Cl.
CPC ......... *B65D 41/005* (2013.01); *B32B 37/1284* (2013.01); *C08G 75/02* (2013.01);
(Continued)

(58) Field of Classification Search
CPC ... B65D 41/005; B32B 37/1284; C08G 75/02; C08G 75/12; C09J 181/02; C08L 81/02
(Continued)

(56) References Cited

U.S. PATENT DOCUMENTS 3,640,923 A   2/1972  Guthrie
4,008,341 A   2/1977  Kehr
(Continued)

FOREIGN PATENT DOCUMENTS

JP    2001-089568    4/2001
JP    2004-326042    11/2004
(Continued)

OTHER PUBLICATIONS

"Sealants and Sealing" webpage address http://www.mlevel3.com/BCIT/Sealants.htm, accessed Oct. 6, 2013, webpage available online at least as early as Aug. 2012.*
(Continued)

*Primary Examiner* — Robert S Walters, Jr.
(74) *Attorney, Agent, or Firm* — William R. Lambert

(57) ABSTRACT

UV curable sealants, method s for making the sealants, and method for using the sealants are disclosed. The UV curable sealants may be used in seal caps useful to seal fasteners in aerospace fuel tanks. The UV curable sealants may also be used to smooth defects in surfaces such as aerospace surfaces.

24 Claims, 8 Drawing Sheets

Related U.S. Application Data continuation-in-part of application No. 12/855,725, filed on Aug. 13, 2010, now Pat. No. 8,729,198.

(51) Int. Cl.

| | | |
|---|---|---|
| *B32B 37/12* | (2006.01) | |
| *C08G 75/02* | (2016.01) | |
| *C08G 75/12* | (2016.01) | |
| *C09J 181/02* | (2006.01) | |
| *C08L 81/02* | (2006.01) | |

(52) U.S. Cl.
 CPC ............. *C08G 75/12* (2013.01); *C08L 81/02* (2013.01); *C09J 181/02* (2013.01)

(58) Field of Classification Search
 USPC ................................. 427/515, 508
 See application file for complete search history.

(56) References Cited

U.S. PATENT DOCUMENTS

| | | | |
|---|---|---|---|
| 4,366,307 A | 12/1982 | Singh et al. | |
| 4,826,380 A | 5/1989 | Henry | |
| 4,886,862 A | 12/1989 | Kuwamura et al. | |
| 5,352,530 A | 10/1994 | Tanuma et al. | |
| 5,432,226 A | 7/1995 | Aonuma et al. | |
| 5,912,319 A | 6/1999 | Zook et al. | |
| 5,959,071 A | 9/1999 | DeMoss et al. | |
| 6,015,475 A | 1/2000 | Hsieh et al. | |
| 6,172,179 B1 | 1/2001 | Zook et al. | |
| 6,232,401 B1 | 5/2001 | Zook et al. | |
| 6,479,622 B1 | 11/2002 | Gross et al. | |
| 6,551,710 B1 | 4/2003 | Chen et al. | |
| 7,438,974 B2 * | 10/2008 | Obuhowich | 428/346 |
| 8,426,112 B2 | 4/2013 | Nakajima et al. | |
| 2002/0007015 A1 | 1/2002 | DeMoss et al. | |
| 2002/0013450 A1 | 1/2002 | Zook et al. | |
| 2004/0039121 A1 | 2/2004 | Zook et al. | |
| 2006/0270796 A1 | 11/2006 | Sawant et al. | |
| 2007/0142605 A1 | 6/2007 | Bojkova et al. | |
| 2009/0047531 A1 | 2/2009 | Bartley et al. | |
| 2009/0286002 A1 | 11/2009 | Iezzi et al. | |
| 2009/0286015 A1 | 11/2009 | Matsukawa et al. | |
| 2010/0130687 A1 | 5/2010 | Tu et al. | |
| 2012/0040103 A1 * | 2/2012 | Keledjian et al. | 427/515 |
| 2012/0040104 A1 * | 2/2012 | Keledjian et al. | 427/515 |

FOREIGN PATENT DOCUMENTS

| | | |
|---|---|---|
| WO | WO 03/029665 A1 | 4/2003 |
| WO | 2009/137192 A2 | 11/2009 |
| WO | WO 2012/021781 A1 | 2/2012 |
| WO | WO 2012/021793 A1 | 2/2012 |

OTHER PUBLICATIONS

Caddy et al., "Photoactive Liquid Polysulfide : Preparation, Characterisation, Photocuring and Potential Applications", European Polymer Journal, 2003, vol. 39, p. 461-487.

* cited by examiner

USES OF UV-CURABLE POLYTHIOETHER SEALANTS FOR SEALING FASTENERS AND FOR SMOOTHING SURFACES

CROSS REFERENCE TO RELATED APPLICATIONS

This application is a continuation-in-part and claims priority to U.S. patent application Ser. No. 12/855,725, filed Aug. 13, 2010, which is incorporated herein by reference in its entirety. This application is also a continuation-in-part and claims priority to U.S. patent application Ser. No. 12/855,729, filed Aug. 13, 2010, which is incorporated herein by reference in its entirety.

FIELD

The present disclosure relates to UV-curable sealant compositions suitable for use in aerospace sealant applications. More particularly, the disclosure relates to preformed UV-curable sealant shells having a cavity filled with a UV-curable sealant, methods for making such shells, and methods for applying such shells to a substrate. The disclosure also relates to methods of using UV-curable sealant compositions to fill and smooth depressions and gaps on a substrate.

BACKGROUND

Aircraft consist of many parts that are assembled using fasteners. Certain fasteners, such as those within fuel tanks, must be protected from fuel leakage. For other fasteners, such as those on the exterior surface of an aircraft, it is desirable to smooth depressions such as those resulting from countersinks and panel gaps to improve aerodynamic performance and to provide electrical insulation. Compositions used to seal these and other fasteners must meet the demanding aerospace requirements. Furthermore, because of the large number of fasteners and panel gaps on an aircraft, which can be several thousand, it is desirable that the sealant compositions used and the methods of applying the sealant composition be amenable to efficient high-volume processing.

Preformed seal caps having a partially hardened shell comprising a first sealant filled with a partially unhardened second sealant have been used to seal fasteners. These seal caps are maintained at a temperature below the hardening temperature of the second sealant until immediately prior to use at which time the seal caps can be placed on a fastener and cured at ambient temperature. Seal caps and methods of forming such seal caps are disclosed in U.S. Pat. No. 7,438,974. The premixed and frozen seal caps described in U.S. Pat. No. 7,438,974 cure within about two days and are opaque due to the nature of the thermally-curable polymers employed. However, it is desirable to provide a preformed seal cap having a faster curing time and that is visually transparent. A visually transparent sealant material, both before and after curing, is desirable in order to facilitate visual assessment of the quality of the seal between the sealant and the component such as a fastener. For example, voids or bubbles observed at the interface between the sealant and the part that become apparent after sealing or during use can indicate a need for repair or replacement.

There is a need, therefore, for aerospace sealants for use with fasteners and panel gaps that cure rapidly, that are amenable to visual inspection, and that meet the performance requirements for aerospace sealants. There is also a need to smooth and electrically insulate defects in aerospace surfaces that is amenable to high volume production.

SUMMARY

UV curable sealants that can be used to fabricate seal caps and that can be used to smooth surface defects and that address the deficiencies of previous sealants and methods are disclosed.

In a first aspect, seal caps are disclosed comprising a preformed, at least partially cured, first sealant composition forming a shell; and an at least partially uncured, second sealant composition filling the shell, wherein the first sealant composition and the second sealant composition are visually clear and transmissive to UV radiation; and the first sealant composition and the second sealant composition comprise (i) a thiol-terminated polythioether; and (ii) an alkenyl-terminated compound, such as an alkenyl-terminated compound comprising a polyvinyl ether and/or a polyallyl compound.

In a second aspect, methods of smoothing surface defects are provided comprising applying a sealant composition to the surface defect; smoothing the sealant composition to fill the surface defect; exposing the smoothed sealant composition to ultraviolet radiation to cure the smoothed sealant composition, wherein the sealant composition is UV-curable and comprises (i) a thiol-terminated polythioether; and (ii) an alkenyl-terminated compound comprising a polyvinyl ether and/or a polyallyl compound.

Reference is now made to certain embodiments of UV-curable compositions and uses of UV-curable compositions. The disclosed embodiments are not intended to be limiting of the claims. To the contrary, the claims are intended to cover all alternatives, modifications, and equivalents.

DETAILED DESCRIPTION

Figure 1:
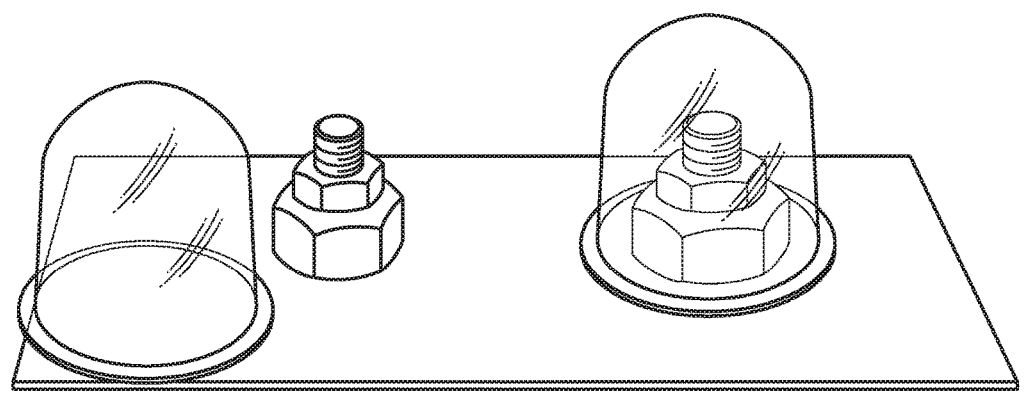
FIG. 1 is a photograph showing a fastener and a UV-curable clear seal cap prior to assembly (left) and a UV-curable seal cap and fastener after assembly and curing (right).

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("-") that is not between two letters or symbols is used to indicate a point of bonding for a substituent or between two atoms. For example, —CONH$_2$ is bonded to another chemical moiety through the carbon atom.

"Alkanediyl" refers to a diradical of a saturated, branched or straight-chain, acyclic hydrocarbon group, having, for example, from 1 to 18 carbon atoms ($C_{1-18}$), from 1-14 carbon atoms ($C_{1-14}$), from 1-6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methane-diyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"At least partially transmissive to ultraviolet radiation" means that a material allows the transmission of at least part of the ultraviolet spectrum. In certain embodiments, a material that is at least partially transmissive to ultraviolet radiation transmits sufficient UV radiation to initiate curing of the thiol-ene reaction by means of a photoinitiator. In certain embodiments, a material that is at least partially UV transmissive partially allows UV transmission at wavelengths from about 180 nanometers to about 400 nanometers. A material that is at least partially transmissive to UV radiation may attenuate transmission at certain UV wavelengths and not others.

"Alkanediyl" refers to a diradical of a saturated, branched or straight-chain, acyclic hydrocarbon group, having, for example, from 1 to 18 carbon atoms ($C_{1-18}$), from 1-14 carbon atoms ($C_{1-14}$), from 1-6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methane-diyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkenyl" refers to a group —CH═CH$_2$.

"Alkenyl-terminated compound" refers to a compound having two or more terminal alkenyl groups. In certain embodiments, an alkenyl-terminated compound comprises a compound of Formula (VI):

   (VI)

wherein:
$R^{10}$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^4$)$_s$—X—]$_q$—(CHR$^4$)$_r$—;
wherein:
each $R^4$ is independently selected from hydrogen and methyl;
each X is independently selected from —O—, —S—, and —NR— wherein R is selected from hydrogen and methyl;
s is an integer from 2 to 6;
q is an integer from 1 to 5; and
r is an integer from 2 to 10.

An alkenyl-terminated compound may have two, three, or four terminal alkenyl groups. In certain embodiments, an alkenyl-terminated compound may comprise a mixture of alkenyl-terminated compounds. In certain embodiments, an alkenyl-terminated compound comprises polyvinyl ether, a polyallyl compound, or a combination thereof. In certain embodiments, an alkenyl-terminated compound comprises polyvinyl ether, in certain embodiments, a divinyl ether, and in certain embodiments, a divinyl ether of Formula (IV). In certain embodiments, an alkenyl-terminated compound comprises a polyallyl compound, in certain embodiments, a triallyl compound, and in certain embodiments, triallyl cyanurate, triallyl isocyanurate, or a combination thereof.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

"Fully transmissive to ultraviolet radiation" means that the material does not attenuate the transmission of at least part of the ultraviolet spectrum. In certain embodiments, the material that is fully transmissive to UV radiation does not appreciably attenuate UV radiation at least at some wavelengths from about 180 nanometers to about 400 nanometers.

"Fully cured" means that the reactants in a composition have completely reacted. In general, a fully cured composition achieves material properties that do not appreciably change during the useful life of the product.

"Fully uncured" means that the reactants in a composition are essentially unreacted or minimally reacted.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

"Preformed" refers to a material that has been partially or fully cured into a particular shape.

"Visually clear" refers to the ability to look through a material with sufficient clarity to observe parts beneath the material.

Reference is now made to certain embodiments of polyfunctional epoxies, polymers, compositions, and methods. The disclosed embodiments are not intended to be limiting of the claims. To the contrary, the claims are intended to cover all alternatives, modifications, and equivalents.

UV-Curable Sealants

Sealants used in aerospace application are required to exhibit several demanding performance requirements including flexibility, fuel resistance, adhesion, and high temperature resistance.

Compositions comprising polythioether polymers can, in general, meet these requirements. Certain polythioethers are visually transparent and polythioethers can be adapted for use with a number of curing chemistries, including by ultraviolet (UV) radiation. For example, thiol-terminated polythioethers or combinations of thiol-terminated polythioethers can be reacted with an alkenyl-terminated compound or mixture of alkenyl-terminated compounds in the presence of a UV-initiated free radical catalyst to provide a cured, cross-linked polymer. Polythioether sealant compositions curable by actinic radiation such as UV radiation are described in U.S. Publication No. 2012/0040104, which is incorporated by reference herein.

Using H-bulb UV or LED UV light sources at a dosage, for example, from 500 mJ to about 1,500 mJ, such compositions having a thickness up to several inches can be cured in less than about 2 minutes. In certain embodiments, a sealant may include fillers and/or pigments that maintain a visually transparent or translucent appearance.

The uncured sealant compositions used in the methods of the present disclosure comprise a thiol-terminated polythioether. As used herein, the term "polythioether" refers to compounds comprising at least two thioether linkages, that is, "—C—S—C—" linkages. Thiol-terminated polythioethers and methods for their production, which are suitable for use in the present disclosure include, for example, those disclosed in U.S. Pat. No. 4,366,307 at col. 3, line 7 to col. 9, line 51 and U.S. Pat. No. 6,172,179 at col. 5, line 42 to col. 12, line 7, the cited portions of which are incorporated by reference herein.

In certain embodiments, a thiol-terminated polythioether comprises a polythioether that includes a structure having the Formula (I):

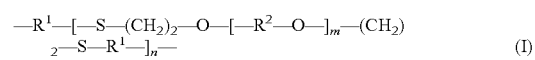   (I)

wherein: (1) each $R^1$ independently denotes a $C_{2-6}$ n-alkanediyl, $C_{2-6}$ branched alkanediyl, $C_{6-8}$ cycloalkanediyl or $C_{6-10}$ alkanecycloalkanediyl group, —[(—CH$_2$—)$_p$—X—]$_q$—(—CH$_2$—)$_r$—, or —[(CH$_2$—)$_p$—X—]$_q$—(—CH$_2$—)$_r$— in which at least one —CH$_2$— unit is substituted with a methyl group, wherein (i) each X is independently selected from O, S, and —NR$^6$—, wherein R$^6$ denotes hydrogen or methyl; (ii) p is an integer having a value ranging from 2 to 6; (iii) q is an integer having a value ranging from 0 to 5; and (iv) r is an integer having a value ranging from 2 to 10; (2) each $R^2$ independently denotes a $C_{2-6}$ n-alkanediyl, $C_{2-6}$ branched alkanediyl, $C_{6-8}$ cycloalkanediyl or $C_{6-10}$ alkanecycloalkanediyl group, or —[(—CH$_2$—)$_p$—X—]$_q$—(—CH$_2$—)r-, wherein (i) each X is independently selected from O, S, and —$NR^6$—, wherein $R^6$ denotes hydrogen or methyl; (ii) p is an integer having a value ranging from 2 to 6; (iii) q is an integer having a value ranging from 0 to 5; and (iv) r is an integer having a value ranging from 2 to 10; (3) m is a rational number from 0 to 10; and (4) n is an integer having a value ranging from 1 to 60. Such polythioethers and methods for their production are further described in U.S. Pat. No. 6,172,179.

More particularly, in certain embodiments, a thiol-terminated polythioether has a structure according to Formula (II):

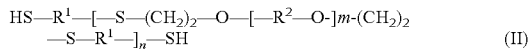

$$HS-R^1-[-S-(CH_2)_2-O-[-R^2-O-]_m-(CH_2)_2-S-R^1-]_n-SH \quad (II)$$

in which $R^1$, $R^2$, m and n are as described above with respect to Formula (I).

In certain embodiments, a thiol-terminated polythioether is polyfunctionalized. As a result, in certain embodiments, a thiol-terminated polythioether has a structure according to Formula (III):

$$B\text{-}(A\text{-}[R^3]_y-SH)_z \quad (III)$$

wherein: (1) A denotes a structure according to Formula (I); (2) y is 0 or 1; (3) $R^3$ denotes a single bond when y=0 and —S—$(CH_2)_2$—[—O—$R^2$—]$_m$—O— when y=1; (4) z is an integer from 3 to 6; and (5) B denotes a z-valent residue of a polyfunctionalizing agent.

Suitable methods for making such polyfunctionalized polythioether polymers are disclosed, for example, in U.S. Pat. No. 6,172,179 at col. 7, line 48 to col. 12, line 7, the cited portion of which are incorporated by reference.

Compositions provided by the present disclosure may include a combination of polyfunctional thiol-terminated polythioethers, such as a combination of thiol-terminated polythioethers of Formula (II) and Formula (III).

An uncured sealant compositions used in the methods of the present disclosure also comprises an alkenyl-terminated compound, such as an alkenyl-terminated compound such as a polyvinyl ether and/or a polyallyl compound. In certain embodiments, an alkenyl-terminated compound comprises a compound of Formula (VI):

$$CH_2=CH-R^{10}-CH=CH_2 \quad (VI)$$

wherein:
$R^{10}$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—$(CHR^4)_s$—X—]$_q$—$(CHR^4)_r$—;
wherein:
each $R^4$ is independently selected from hydrogen and methyl;
each X is independently selected from —O—, —S—, and —NR— wherein R is selected from hydrogen and methyl;
s is an integer from 2 to 6;
q is an integer from 1 to 5; and
r is an integer from 2 to 10.

In certain embodiments, of an alkenyl-terminated compound of Formula (VI), $R^{10}$ is $C_{2-6}$ alkanediyl, $C_{6-8}$ cycloalkanediyl, $C_{6-10}$ alkanecycloalkanediyl, and in certain embodiments, $C_{5-8}$ heterocycloalkanediyl.

In certain embodiments, of an alkenyl-terminated compound of Formula (VI), $R^{10}$ is —[—$(CHR^4)_s$—X—]$_q$—$(CHR^4)_r$—.

In certain embodiments, of an alkenyl-terminated compound of Formula (VI), each $R^4$ is hydrogen.

In certain embodiments, of an alkenyl-terminated compound of Formula (VI), each X is selected from —O— and —S—. In certain embodiments, of an alkenyl-terminated compound of Formula (VI), each X is —O— and in certain embodiments, each X is —S—.

In certain embodiments, a polyallyl compound present in the uncured sealant composition comprises a triallyl compound, which refers to compounds comprising three allyl groups (C=C—C) and which include, for example, triallyl cyanurate (TAC) and triallyl isocyanurate (TAIC).

In certain embodiments, an alkenyl-terminated compound comprises a polyvinyl ether. Suitable polyvinyl ethers include, for example, those represented by Formula (IV):

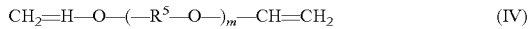

$$CH_2=H-O-(-R^5-O-)_m-CH=CH_2 \quad (IV)$$

where $R^5$ in Formula (IV) is a $C_{2-6}$ n-alkanediyl group, a $C_{2-6}$ branched alkanediyl group, a $C_{6-8}$ cycloalkanediyl group, a $C_{6-10}$ alkanecycloalkanediyl group, or —[(—$CH_2$—)$_p$—O—]$_q$—(—$CH_2$—)$_r$—, where p is an integer having a value ranging from 2 to 6, q is an integer having a value ranging from 1 to 5, and r is an integer having a value ranging from 2 to 10.

The materials of Formula (IV) are divinyl ethers. Suitable divinyl ethers include those compounds having at least one oxyalkanediyl group, such as from 1 to 4 oxyalkanediyl groups, i.e., those compounds in which m in Formula (IV) is an integer from 1 to 4. In some cases, m in Formula (IV) is an integer from 2 to 4. It is also possible to employ commercially available divinyl ether mixtures to produce the polymers of the present disclosure. Such mixtures are characterized by a non-integral average value for the number of oxyalkanediyl units per molecule. Thus, m in Formula (IV) can also take on rational number values between 0 and 10.0, such as between 1.0 and 10.0, between 1.0 and 4.0, or between 2.0 and 4.0.

Suitable divinyl ether monomers for use in the present disclosure include, for example, divinyl ether, ethylene glycol divinyl ether (EG-DVE) (R in Formula (IV) is ethylene and m is 1), butanediol divinyl ether (BD-DVE) (R in Formula (IV) is butylene and m is 1), hexanediol divinyl ether (HD-DVE) (R in Formula (IV) is hexylene and m is 1), diethylene glycol divinyl ether (DEG-DVE) (R in Formula (IV) is ethylene and m is 2), triethylene glycol divinyl ether (R in Formula (IV) is ethylene and m is 3), tetraethylene glycol divinyl ether (R in Formula (IV) is ethylene and m is 4), cyclohexanedimethanol divinyl ether, polytetrahydrofuryl divinyl ether and mixtures thereof. In some cases, trivinyl ether monomers, such as trimethylolpropane trivinyl ether; tetrafunctional ether monomers, such as pentaerythritol tetravinyl ether; and mixtures of two or more such polyvinyl ether monomers can be used. The polyvinyl ether material can have one or more pendant groups selected from alkyl groups, hydroxyl groups, alkoxy groups and amine groups.

Useful divinyl ethers in which R in Formula (IV) is $C_{2-6}$ branched alkanediyl can be prepared by reacting a polyhydroxy compound with acetylene. Exemplary compounds of this type include compounds in which R in Formula (IV) is an alkyl-substituted methylene group such as —CH(CH$_3$)— (for example Pluriol® blends such as Pluriol® E-200 divinyl ether (BASF Corp. of Parsippany, N.J.), for which R in Formula (IV) is ethylene and m is 3.8) or an alkyl-substituted ethylene (for example —CH$_2$CH(CH$_3$)— such as DPE polymeric blends including DPE-2 and DPE-3 (International Specialty Products, Wayne, N.J.)).

Other useful divinyl ethers include compounds in which R in Formula (IV) is polytetrahydrofuryl (poly-THF) or polyoxyalkanediyl, such as those having an average of about 3 monomer units.

Two or more divinyl ether monomers of the Formula (IV) can be used if desired.

In certain embodiments, the uncured sealant composition used in the methods of the present disclosure also comprises an ethylenically unsaturated silane, such as, for example, a sulfur-containing ethylenically unsaturated silane, which has been shown to, in at least some cases, improve the adhesion of a cured sealant formed by the methods of the present disclosure to a metal substrate (to an extent greater than achieved when a conventional adhesion promoter, such as those described below, is used). As used herein, the term "sulfur-containing ethylenically unsaturated silane" refers to a molecular compound that comprises, within the molecule, (i) at least one sulfur (S) atom, (ii) at least one, in some cases at least two, ethylenically unsaturated carbon-carbon bonds, such as a carbon-carbon double bonds (C=C); and (iii) at least one silane group —Si($R^1$)$_{3-x}$(—OR)$_x$, wherein R and $R^1$ each independently represent an organic group and x is 1, 2, or 3).

In certain embodiments, a sulfur-containing ethylenically unsaturated silane, which is suitable for use in the uncured sealant compositions used in the methods of the present disclosure, itself comprises the reaction product of reactants comprising: (i) a mercaptosilane, and (ii) an alkenyl-terminated compound. As used herein, the term "mercaptosilane" refers to a molecular compound that comprises, within the molecule, (i) at least one mercapto (—SH) group, and (ii) at least one silane group (defined above). Suitable mercaptosilanes include, for example, those having a structure according to Formula (V):

HS—R—Si($R^1$)$_m$(—OR')$_{3-m}$      (V)

wherein (i) R is a divalent organic group; (ii) R' is hydrogen or an alkyl group; (iii) $R^1$ is hydrogen or an alkyl group; and (iv) m is an integer from 0 to 2.

Examples of mercaptosilanes suitable for use in preparing the sulfur-containing ethylenically unsaturated silanes suitable for use in the present disclosure, include, γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltrimethoxysilane, mercaptomethyltriethoxysilane, and combinations of any of the foregoing In certain embodiments, an alkenyl-terminated compound used to prepare a sulfur-containing ethylenically unsaturated silanes suitable for use in the present disclosure comprises a compound having three terminal alkenyl groups, such as is the case with the triallyl compounds mentioned above.

The examples illustrate suitable methods for producing the sulfur-containing ethylenically unsaturated silanes suitable for use in the present disclosure. In certain embodiments, an alkenyl-terminated compound comprises a compound having three terminal alkenyl groups, such as one or more of the foregoing triallyl compounds, and the mercaptosilane and compound having three terminal alkenyl groups are reacted together in relative amounts such that the resulting reaction product theoretically comprises an average of at least two ethylenically unsaturated groups per molecule.

Compositions of the present disclosure may contain an essentially stoichiometric equivalent amount of thiol groups to alkenyl groups in order to obtain a cured sealant having acceptable sealant properties as described herein upon exposure of the composition to actinic radiation. As used herein, "essentially stoichiometric equivalent" means that the number of thiol groups and alkenyl groups present in the compositions differ by no more than 10% from each other, in some cases, no more than 5% or, in some cases, no more than 1% or no more than 0.1%. In some cases, the number of thiol groups and alkenyl groups present in the composition are equal. Moreover, as will be appreciated, the source of alkenyl groups in the compositions of the present disclosure can include the ethylenically unsaturated silane itself (if used) as well as the other alkenyl-terminated compounds included in the composition. In certain embodiments, an ethylenically unsaturated silane described herein is present in an amount such that 0.1 to 30, such as 1 to 30, or, in some cases, 10 to 25 percent of the total number of ethylenically unsaturated groups present in the composition are part of an ethylenically unsaturated silane molecule, based on the number of ethylenically unsaturated groups in the composition.

In certain embodiments, a sealant composition comprises (a) a thiol-terminated polythioether; (b) an alkenyl-terminated compound, such as an alkenyl-terminated compound comprising a polyvinyl ether and/or a polyallyl compound, and wherein the composition comprises an essentially stoichiometric equivalent amount of thiol groups to alkenyl groups.

In certain embodiments of a sealant composition, a thiol-terminated polythioether comprises a structure having the formula:

—$R^1$—[—S—(CH$_2$)$_2$—O—[—$R_2$—O—]$_m$—(CH$_2$)$_2$—S—$R^1$—]$_n$— wherein
(1) each $R^1$ independently denotes a C$_{2-10}$ n-alkanediyl group, a C$_{2-6}$ branched alkanediyl group, a C$_{6-8}$ cycloalkanediyl group, a C$_{6-10}$ alkanecycloalkanediyl group, —[(—CH$_2$—)$_p$—X—]$_q$—(—CH$_2$—)$_r$— or —[(—CH$_2$—)$_p$—X—]$_q$—(—CH$_2$—)$_r$— in which at least one —CH$_2$— unit is substituted with a methyl group, wherein
    (i) each X is independently selected from O, S, and —NR$^6$—, wherein R$^6$ is hydrogen or methyl,
    (ii) p is an integer having a value ranging from 2 to 6;
    (iii) q is an integer having a value ranging from 0 to 5; and
    (iv) r is an integer having a value ranging from 2 to 10;
(2) each $R^2$ independently denotes a C$_{2-10}$ n-alkanediyl group, a C$_{2-6}$ branched alkanediyl group, a C$_{6-8}$ cycloalkanediyl group, a C$_{6-10}$ alkanecycloalkanediyl group, or —[(—CH$_2$—)$_p$—X—]$_q$—(—CH$_2$—)$_r$—, wherein
    (i) each X is independently selected from O, S, and —NR$^6$—, wherein R$^6$ is hydrogen or methyl,
    (ii) p is an integer having a value ranging from 2 to 6;
    (iii) q is an integer having a value ranging from 0 to 5; and
    (iv) r is an integer having a value ranging from 2 to 10;
(3) m is a rational number from 0 to 10; and
(4) n is an integer having a value ranging from 1 to 60.

In certain embodiments of a sealant composition, an alkenyl-terminated compound comprises a polyvinyl ether.

In certain embodiments of a sealant composition, a polyvinyl ether comprises a divinyl ether.

In certain embodiments of a sealant composition, a sealant composition further comprises a sulfur-containing ethylenically unsaturated silane.

In certain embodiments, a sealant composition comprises (a) a thiol-terminated polythioether; (b) an alkenyl-terminated compound comprising a polyvinyl ether and/or a polyallyl compound; and (c) a photoinitiator.

In certain embodiments of a sealant composition, a composition comprises an essentially stoichiometric equivalent amount of thiol groups to ene groups.

In certain embodiments of a sealant composition, a thiol-terminated polythioether comprises a structure having the formula:

—R¹—[—S—(CH$_2$)$_2$—O—[—R²—O—]$_m$—(CH$_2$)$_2$—S—R¹—]$_n$— wherein (1) each R¹ independently denotes a C$_{2-10}$ n-alkanediyl group, a C$_{2-6}$ branched alkanediyl group, a C$_{6-8}$ cycloalkanediyl group, a C$_{6-10}$ alkanecycloalkanediyl group, —[(—CH$^2$—)$_p$—X—]$_q$—(—CH$_2$—)$_r$— or —[(—CH$_2$—)$_p$—X—]$_q$—(—CH$_2$—)$_r$— in which at least one —CH$_2$— unit is substituted with a methyl group, wherein (i) each X is independently selected from O, S, and —NR$^6$—, wherein R$^6$ is hydrogen or methyl, (ii) p is an integer having a value ranging from 2 to 6;

(iii) q is an integer having a value ranging from 0 to 5; and (iv) r is an integer having a value ranging from 2 to 10;

(2) each R² independently denotes a C$_{2-10}$ n-alkanediyl group, a C$_{2-6}$ branched alkanediyl group, a C$_{6-8}$ cycloalkanediyl group, a C$_{6-10}$ alkanecycloalkanediyl group, or —[(—CH$_2$—)$_p$—X—]$_q$—(—CH$_2$—)$_r$—, wherein (i) each X is independently selected from O, S, and —NR$^6$—, wherein R$^6$ is hydrogen or methyl, (ii) p is an integer having a value ranging from 2 to 6;

(iii) q is an integer having a value ranging from 0 to 5; and (iv) r is an integer having a value ranging from 2 to 10;

(3) m is a rational number from 0 to 10; and (4) n is an integer having a value ranging from 1 to 60.

In certain embodiments of a sealant composition, an alkenyl-terminated compound comprises a polyvinyl ether.

In certain embodiments of a sealant composition, a sealant composition further comprises a sulfur-containing ethylenically unsaturated silane.

In certain embodiments, a sulfur-containing polymer is thiol-terminated. Examples of thiol-functional polythioethers are disclosed, for example in U.S. Pat. No. 6,172,179. In certain embodiments, a thiol-terminated polythioether comprises Permapol® P3.1E, available from PRC-DeSoto International Inc., Sylmar, Calif. In certain embodiments, a thiol-terminated polymer comprises a mixture of thiol-terminated polythioethers having an average functionality from about 2 to about 3, and in certain embodiments, from about 2.2 to about 2.8. In certain embodiments, a thiol-terminated polythioether comprises Permapol® 3.1E, available from PRC-DeSoto International.

As indicated, methods of the present disclosure comprise exposing an uncured sealant composition to actinic radiation to provide a cured sealant. In certain embodiments, particularly when the cured sealant is to be formed by exposure of an uncured or partially cured sealant composition to UV radiation, a composition also comprises a photoinitiator. A photoinitiator absorbs ultraviolet radiation and is transformed into a radical that initiates polymerization. Photoinitiators are classified in two major groups based upon a mode of action, either or both of which may be used in the compositions described herein. Cleavage-type photoinitiators include acetophenones, α-aminoalkylphenones, benzoin ethers, benzoyl oximes, acylphosphine oxides, bisacylphosphine oxides, and combinations of any of the foregoing. Abstraction-type photoinitiators include benzophenone, Michler's ketone, thioxanthone, anthraquinone, camphorquinone, fluorone, ketocoumarin, and combinations of any of the foregoing.

Examples of photoinitiators that may be used in the present disclosure include, for example, benzil, benzoin, benzoin methyl ether, benzoin isobutyl ether benzophenol, acetophenone, benzophenone, 4,4'-dichlorobenzophenone, 4,4'-bis(N,N'-dimethylamino)benzophenone, diethoxyacetophenone, fluorones, e.g., the H-Nu series of initiators available from Spectra Group Ltd., 2-hydroxy-2-methyl-1-phenylpropan-1-one, 1-hydroxycyclohexyl phenyl ketone, 2-isopropylthixantone, α-aminoalkylphenone, e.g., 2-benzyl-2-dimethylamino-1-(4-morpholinophenyl)-1-butanone, acylphosphine oxides, e.g., 2,6-dimethylbenzoyldiphenyl phosphine oxide, 2,4,6-trimethylbenzoyldiphenylphosphine oxide, bis(2,4,6-trimethylbenzoyl)phenyl phosphine oxide, 2,6-dichlorobenzoyldiphenylphosphine oxide, and 2,6-dimethoxybenzoyldiphenylphosphine oxide, bisacylphosphine oxides, e.g., bis(2,6-dimethyoxybenzoyl)-2,4,4-trimethylpentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, and bis(2,6-dichlorobenzoyl)-2,4,4-trimethylpentylphosphine oxide, and combinations of any of the foregoing. In certain embodiments, a photoinitiator comprises Irgacure® 2022, i.e., phenylbis(2,4,6-trimethylbenzoyl)-phosphine oxide).

In certain embodiments, compositions described herein comprise 0.01 up to 15 percent by weight of photoinitiator or, in some embodiments, 0.01 up to 10 percent by weight, or, in yet other embodiments, 0.01 up to 5 percent by weight of photoinitiator based on the total weight of the composition.

Fillers useful in the certain embodiments of the compositions described herein include those commonly used in the art, including conventional inorganic fillers, such as fumed silica, calcium carbonate (CaCO$_3$), and carbon black, as well as lightweight fillers. Fillers that are substantially transparent to ultraviolet radiation, such as fumed silica, may be particularly useful in some embodiments. Suitable lightweight fillers include, for example, those described in U.S. Pat. No. 6,525,168 at col. 4, lines 23-55, the cited portion of which is incorporated by reference and those described in U.S. Application Publication No. 2010/0041839 A1 at [0016] to [0052], the cited portion of which is incorporated by reference.

Other useful fillers include micronized silica gel, talc, and titanium dioxide. For applications in which it is desirable that the cured sealant is clear to enable, for example, visual inspection such as a clear seal cap, the amount of filler can be from about 1 wt % to about 30 wt. In certain embodiments, a clear seal cap comprises about 1.5 wt % filler. Higher filler content can be useful in application s such as surface smoothing in which it is desirable to abrade or sand the cured sealant. The choice of filler is at least in part determined by the index of refraction of the filler. It is desirable that the filler not block UV radiation, and that the filler transmit and/or internally scatter reflected UV radiation.

In certain embodiments, a sealant may include a small amount of reactive diluent such as hydroxybutyl vinyl ether or other low viscosity compound having a terminal hydroxy group, such as a linear hydrocarbon having a terminal hydroxy group. In certain embodiments, the amount of reactive diluent in a composition may be from about 0 wt % to about 3 wt %, from about 0.25 wt % to about 2 wt %, from about 0.5 wt % to about 1 wt %, and in certain embodiments, about 0.5 wt %.

UV curable sealant compositions may also include cross linkers such as divinyl ethers including, for example, triethylene glycol divinylether (DVE). In certain embodiments, a crosslinker may comprise a difunctional compound, a trifunctional compound, or a combination thereof. A trifunctional crosslinker may be prepared by reacting DVE with a trifunctionalizing agent such as TAC. In certain embodiments, a cross linker comprises a combination of difunctional and trifunctional crosslinkers in a ratio of 80/20

(wt %/wt %) or from 90/10 (wt %/wt %). In certain of such embodiments, the difunctional crosslinker is DVE and the trifunctional crosslinker comprises the reaction product of DVE and TAC.

UV curable sealant compositions provided by the present disclosure may also contain an adhesion promoter such as sulfur-containing adhesion promoter. Useful sulfur-containing adhesion promoters are disclosed in U.S. application Ser. No. 13/529,183, filed on Jun. 21, 2012. Such adhesion promoters comprise the reaction product of a sulfur-containing compound such as DMDO and a trifunctionalizing agent such as TAC and having at least some terminal thiol groups and some terminal mercaptosilane groups.

UV curable sealants also include a photoinitiator that is matched to UV radiation source. In general, it is desirable to use a radiation source having a longer wavelength, such as, for example, from 280 nm to 290 nm to give a better depth of cure. In general, it is desirable to cure a sealant in less than about 30 seconds.

In some embodiments, compositions provided by the present disclosure include a photoactive filler. As used herein, the term "photoactive filler" refers to a filler that comprises a material that is photoexcitable upon exposure to, and absorption of, ultraviolet and/or visible radiation. A photoactive material is a material that, when exposed to light having higher energy than the energy gap between the conduction band and the valence band of the crystal, causes excitation of electrons in the valence band to produce a conduction electron thereby leaving a hole behind on the particular valence band. Examples of photoactive fillers suitable for use in certain composition described herein are metal oxides, such as, for example, zinc oxide, tin oxide, ferric oxide, dibismuth trioxide, tungsten trioxide, titanium dioxide (including the brookite, anatase, and/or rutile crystalline forms of titanium dioxide), and mixtures thereof.

In certain embodiments, the compositions include 1 weight percent to 60 weight percent of the filler or combination of fillers, such as 10 weight percent to 50 weight percent, based on the total weight of the composition, so long as the presence of such fillers in such amounts does not cause a significant detrimental effect on the performance of the composition.

In certain embodiments, a composition includes an amount of filler sufficient to enable the cured sealant to be abraded such as by sanding. Sanding the cured sealant may be useful in applications in which the sealant is used to smooth surface defects such as depressions, dents, or gaps. Sanding the cured sealant can be useful to smooth the cured sealant to match the contour of the surface to which the sealant was applied. This can be particularly important in applications in which it is desirable to have an aerodynamically smooth surface.

In addition to the foregoing constituents, certain compositions of the disclosure can optionally include one or more of the following: thixotropes, conventional adhesion promoters, retardants, solvents and masking agents, among other components. However, in selecting the components, the components in combination enable visual inspection through the cured sealant and UV curing to an appropriate depth, in addition to enabling the cured sealant to meet aerospace sealant requirements.

Thixotropes, for example silica, are often used in an amount from 0.1 to 5 weight percent, based on the total weight of the composition.

Retardants, such as stearic acid, likewise often are used in an amount from 0.1 to 5 weight percent, based on the total weight of the composition. Conventional adhesion promoters, if employed, are often present in amount from 0.1 to 15 weight percent, based on the total weight of the composition. Suitable such adhesion promoters include phenolics, such as Methylon® phenolic resin available from Occidental Chemicals, and organosilanes, such as epoxy, mercapto or amino functional silanes, such as Silquest® A-187 and Silquest® A-1100 available from Momentive Performance Materials. Masking agents, such as pine fragrance or other scents, which are useful in covering any low level odor of the composition, are often present in an amount from 0.1 to 1 weight percent, based on the total weight of the composition.

In certain embodiments, the compositions comprise a plasticizer such as a reactive diluent, which, in at least some cases, may allow the composition to include polymers which have a higher $T_g$ than would ordinarily be useful in an aerospace sealant. That is, use of a plasticizer may effectively reduce the Tg of the composition, and thus increase the low-temperature flexibility of the cured composition beyond that which would be expected on the basis of the $T_g$ of the polymer alone. Plasticizers that are useful in certain embodiments of the compositions of the present disclosure include, for example, a linear hydrocarbon. The plasticizer or combination of plasticizers may comprise 1 to 40 weight percent, such as 1 to 10 weight percent of the composition. In certain embodiments, depending on the nature and amount of the plasticizer(s) used in the composition, polymers of the disclosure which have $T_g$ values up to −50° C., such as up to −55° C., can be used.

In certain embodiments, a composition can further comprise one or more organic solvents, such as isopropyl alcohol, in an amount ranging from, for example, 0 to 15 percent by weight on a basis of total weight of the composition, such as less than 15 weight percent and, in some cases, less than 10 weight percent. In certain embodiments, however, the compositions of the present disclosure are substantially free or, in some cases, completely free, of any solvent, such as an organic solvent or an aqueous solvent, i.e., water. Stated differently, in certain embodiments, the compositions of the present disclosure are substantially 100% solids.

As should be appreciated from the foregoing description, the present disclosure is also directed to compositions comprising: (a) a thiol-terminated polythioether; and (b) an alkenyl-terminated compound comprising a polyvinyl ether and/or a polyallyl compound. These compositions comprise an essentially stoichiometric equivalent amount of thiol groups and alkenyl groups. Moreover, these compositions may comprise one or more of the additional optional components described earlier.

As should also be appreciated from the foregoing description, the present disclosure is also directed to compositions comprising: (a) a thiol-terminated polythioether; (b) an alkenyl-terminated compound comprising a polyvinyl ether and/or a polyallyl compound; and (c) a photoinitiator. Moreover, these compositions may comprise one or more of the additional optional components described earlier.

In certain embodiments, the compositions of the present disclosure have a $T_g$ when cured not higher than −55° C., such as not higher than −60° C., or, in some cases, not higher than −65° C.

As described above, the methods of the present disclosure comprise exposing the uncured sealant composition described above to actinic radiation to provide a cured sealant. The examples herein describe suitable conditions for performing this method step. In some embodiments of the present disclosure, the thiol-ene reaction, which forms the cured sealant, is effected by irradiating an uncured composition comprising: (a) a thiol-terminated polythioether (such as any of those described above); and (b) an alkenyl-terminated compound, with actinic radiation. As used herein, "actinic radiation" encompasses electron beam (EB) radiation, ultraviolet (UV) radiation, and visible light. In many cases, the thiol-ene reaction is effected by irradiating the composition with UV light and, in such cases, as disclosed herein, the composition often further comprises a photoinitiator, among other optional ingredients. mJ is dosage (intensity is watts)

Ultraviolet radiation from any suitable source which emits ultraviolet light having a wavelength ranging from, for example, 180 nanometers to 400 nanometers, may be employed to initiate the thiol-ene reaction described above and thereby form the cured sealant. Suitable sources of ultraviolet light are generally known and include, for example, mercury arcs, carbon arcs, low pressure mercury lamps, medium pressure mercury lamps, high pressure mercury lamps, swirl-flow plasma arcs and ultraviolet light emitting diodes. Certain embodiments of the compositions of the disclosure can exhibit an excellent degree of cure in air at relatively low energy exposure in ultraviolet light.

UV cure of the compositions of the present disclosure to depths of up to 2 inches or more can be achieved in some cases. This means that cured sealants having a thickness of 2 inches or more, and having desirable sealant properties described herein, can be achieved by exposure of the compositions described herein to actinic radiation, such as ultraviolet radiation, in air at relatively low energy exposure.

In certain embodiments, a UV light source can have an emission peak in the range of 250 nm to 400 nm and at any wavelength or combination of wavelengths in between 250 nm and 400 nm. For example, useful UV sources include mercury vapor (250 nm to 400 nm; 600 mW/cm$^2$) and Phoseon Firefly (395 nm; >1000 mW/cm$^2$ setting).

As indicated, certain embodiments of the present disclosure are directed to compositions, such as sealant, coating, and/or electrical potting compositions. As used herein, the term "sealant composition" refers to a composition that is capable of producing a film that has the ability to resist atmospheric conditions, such as moisture and temperature and at least partially block the transmission of materials, such as water, fuel, and other liquid and gasses. In certain embodiments, the sealant compositions of the present disclosure are useful, e.g., as aerospace sealants and linings for fuel tanks.

In certain embodiments, the sealants produced according to the methods of the present disclosure are fuel-resistant. As used herein, the term "fuel resistant" means that a sealant has a percent volume swell of not greater than 40%, in some cases not greater than 25%, in some cases not greater than 20%, in yet other cases not more than 10%, after immersion for one week at 140° F. (60° C.) and ambient pressure in jet reference fluid (JRF) Type I according to methods similar to those described in ASTM D792 or AMS 3269, incorporated herein by reference. Jet reference fluid JRF Type I, as employed herein for determination of fuel resistance, has the following composition (see AMS 2629, issued Jul. 1, 1989), §3.1.1 et seq., available from SAE (Society of Automotive Engineers, Warrendale, Pa.).

In certain embodiments, sealants produced according to the present disclosure have an elongation of at least 100% and a tensile strength of at least 250 psi when measured in accordance with the procedure described in AMS 3279, §3.3.17.1, test procedure AS5127/1, §7.7.

In certain embodiments, sealants produced according to the present disclosure have a tear strength of at least 25 pounds per linear inch (ph) or more when measured according to ASTM D624 Die C.

UV-Curable Seal Caps

UV-curable compositions provided by the present disclosure may be used in preformed seal caps, which are used to seal fasteners such as those used in aircraft fuel tanks. When placed over a fastener and cured, the preformed seal caps allow visual inspection of the seal between the fastener and the cured composition. Methods for making premixed and frozen seal caps using polythioether polymer compositions are disclosed in U.S. Pat. No. 7,438,974, which is incorporated by reference herein. Methods similar to those disclosed in U.S. Pat. No. 7,438,974, can be used to prepare and use the UV curable seal caps provided by the present disclosure.

A preformed seal cap comprises a preformed shell comprising a sealant composition that is at least partially cured and that defines a cavity. The cavity is filled with an at least partially uncured quantity of a sealant composition. The composition forming the preformed shell may be any suitable sealant composition that is visually clear and that is transmissive to UV radiation. In certain embodiments, the composition forming the preformed shell comprises a UV-curable composition provided by the present disclosure. The composition is at least partially cured sufficient to maintain the integrity of the shell to facilitate handling. In such embodiments, the composition forming the preformed shell may be cured following assembly of the preformed seal cap on a fastener either by the same or other curing mechanism as the composition filling the cavity. In certain embodiments, the composition forming the preformed shell is fully cured before the cavity is filled.

The preformed shell may be prepared, for example, by injection molding, compression molding, or other appropriate method. The shell may be any suitable thickness sufficient to retain a sealant composition within the cavity and to facilitate handling and assembly. In certain embodiments, the shell can have a thickness of about 1/32 inches, 1/16 inches, about 1/8 inches, and in certain embodiments, about 1/4 inches. The dimensions of a preformed shell depend at least in part on the dimensions of the fastener intended to be sealed, such that the preformed seal cap completely covers the fastener and provides a surface for adhesion to a substrate to which the fastener is attached.

Similarly, a preformed shell may have any appropriate shape sufficient to cover a fastener and to provide a seal to a substrate to which the fastener is attached. For example, a preformed shell may comprise a first part intended to fit over a fastener and defining an internal cavity in the shaped of a dome or a tube capped by a dome. A preformed shell may include a second part, opposite the dome or cap, with a flared section that can taper to a section configured to conform to a substrate, and that is intended to mount to a substrate. This section also defines the opening to the cavity. The substrate on which the fastener is mounted may be flat or may be other shapes such as curved or arced. In such cases, the flared section of the preformed shell may be configured to have the same shape or similar shape to that of the substrate to which the preformed seal cap is to be mounted.

A photograph of a preformed seal cap before and after mounting on a fastener is shown in FIG. 1. The preformed seal cap shown in FIG. 1 includes a tubular body having a dome on one end and a flared section on the end opposite the domed end.

In certain embodiments, a method for making a sealant comprises (1) forming a first sealant composition into a preformed shape comprising a cavity; (2) at least partially curing the first sealant; (3) filling the cavity with a second sealant composition; and (4) maintaining the second sealant composition at least partially uncured. In certain embodiments, the first sealant composition and the second sealant composition are visually clear; and the first sealant composition and the second sealant composition comprise: (i) a thiol-terminated polythioether; and (ii) an alkenyl-terminated compound, such as an alkenyl-terminated compound comprising a polyvinyl ether and/or a polyallyl compound. The methods further comprise maintaining the second sealant composition at least partially uncured.

In certain embodiments, maintaining the second sealant composition at least partially uncured comprises shielding the second sealant composition from ultraviolet radiation.

In certain embodiments, forming the first sealant composition comprises compressing the first sealant composition to a predetermined thickness.

In certain embodiments, forming the first sealant composition comprises forming the first sealant composition into a concave shell having an internal cavity; and filling the cavity comprises filling the internal cavity with the second sealant.

In certain embodiments, the viscosity of the uncured second sealant filling the cavity is such that it will not readily flow out of the cavity during use, for example, when the seal cap is inverted and placed on a fastener. The viscosity is also such that the uncured sealant conforms to the fastener during assembly and does not entrap air pockets or bubbles. When placed on a fastener, a seal cap may be slowly lowered over and onto a fastener and gently rotated to distribute the uncured sealant onto the surface of the fastener and gradually completely over a seal cap so as to avoid entrapment of air pockets. In certain embodiments, the viscosity of the uncured second sealant is from about 5,000 poise to about 15,000 poise, from about 7,500 poise to about 12,500 poise, and in certain embodiments, about 10,000 poise.

After fabrication and at least partial or full curing to a preformed shell, the preformed shell is filled with an uncured second sealant composition. The uncured second sealant composition comprises a UV-curable composition provided by the present disclosure. The composition forming the preformed shell and filling the cavity may both be a UV-curable composition provided by the present disclosure, and in certain embodiments, may be the same composition. The composition filling the cavity may be partially cured or may be uncured.

Prior to use, such as during storage and shipment, a preformed seal cap comprising the shell and cavity filled with the at least partially uncured sealant may be stored under conditions protected from UV radiation to prevent curing of at least the composition filling the cavity. In embodiments in which the preformed shell is fully cured or comprises a UV-curable composition, the temperature a humidity conditions of the storage and transportation environment do not, in general, affect the curing to of the compositions.

Prior to assembly, the preformed seal caps can be removed from the UV-protection. To seal a fastener, a preformed seal cap is placed over the fastener, placed or pressed onto the substrate surface, and exposed to UV radiation to cure the composition filling the cavity. Prior to curing, the interface between the fastener and the sealant composition and between the substrate and the sealant composition may be visually inspected to ensure that the interface between the fastener, the substrate, and the sealant composition are free of voids, pockets, and/or separations. If such voids, pockets, and/or separations are observed, the preformed seal cap may be repositioned such that the defects are removed, or may be detached, and a new preformed seal cap mounted on the fastener.

Substrate Planarization

In certain applications, UV curable sealants provided by the present disclosure may be used to fill and planarize surface defects such as depressions, dents, joints, and gaps. Aircraft surface may contain thousands of fasteners, and many joints and panel gaps. For example, fasteners that attach outer panels of aircraft are often countersunk and attached to conductive inner surfaces. It is desirable that the countersink depressions be planarized to improve the aerodynamics of the structure and also be electrically insulated. In addition, there can be joints between assemblies and gaps between adjacent panels that are desirable to fill to improve surface aerodynamics and to electrically insulate. These and other objectives can be accomplished by using the UV-curable sealants disclosed herein.

Surface depressions on an aerospace substrate, resulting, for example, from countersunk fasteners or dents, can be filled by applying a UV-curable sealant provided by the present disclosure and exposing the applied sealant to UV radiation to cure the sealant. The sealant may be applied to the depression with an applicator such as a syringe, cartridge, extruder, or spatula in an amount sufficient to fill the depression and smoothed. The applied sealant may be smoothed, for example, by smearing or by applying a plate on top of the sealant. In certain embodiments, the plate may be transparent to UV radiation, such as a glass plate or a plastic sheet such as a polyethylene sheet, thereby enabling pressure to be applied to the sealant during curing. The applied sealant can then be exposed to UV radiation to cure the sealant. If used, the UV-transmissive pressure plate may then be removed to provide an aerodynamically smooth surface. In certain methods, it may be necessary to remove excess sealant or otherwise smooth the interface between the edge of the cured sealant and the aircraft substrate. In certain embodiments, this may be accomplished by sanding the surface using, for example, an abrasive paper, such as 400 wet/dry sand paper.

Similar methods may be used to fill gaps between panels or other surface features.

Such methods may be used during aircraft assembly or during repair and replacement operations. In general, the aircraft surface including the cured UV-curable sealant is painted prior to use.

EXAMPLES

Embodiments provided by the present disclosure are further illustrated by reference to the following examples, which describe UV curable sealant compositions and certain uses of the UV curable sealant compositions. It will be apparent to those skilled in the art that many modifications, both to materials, and methods, may be practiced without departing from the scope of the disclosure.

Example 1

Polythioether Polymer Synthesis

A resin was prepared in the manner described in Example 1 of U.S. Pat. No. 6,232,401. The polymer (theoretical functionality: 2.2) had a mercaptan equivalent weight of 1640 and a viscosity of 70 poise.

Example 2

Polythioether Polymer Synthesis

Triallylcyanurate (TAC) (36.67 g, 0.15 mole) and dimercaptodioxaoctane (DMDO) (449.47 g, 2.47 moles) were charged in a 1-liter 4-neck round-bottom flask. The flask was equipped with a stirrer, gas-passing adapter and thermometer. Stirring was started. The flask was flushed with dry nitrogen, a solution of potassium hydroxide (0.012 g; concentration: 50%) was added and the reaction mixture was heated to 76° C. A solution of radical initiator Vazo®-67 (0.32 g) in diethylene glycol divinyl ether (316.44 g, 2.00 moles) was introduced in the reaction mixture over a period of 2 hours during which a temperature of 66-76° C. was maintained. Following the completion of the addition of the divinyl ether, the temperature of the reaction mixture increased to 84° C. The reaction mixture was cooled to 74° C. and nine portions of Vazo®-67 (about 0.15 g each) were added at an interval of 1 hour while the temperature was maintained at 74-77° C. The reaction mixture was heated at 100° C. for 2 hours, cooled to 80° C., and evacuated at 68-80° C./5-7 mmHg for 1.75 hr. The resulting polymer (theoretical functionality: 2.8) had a mercaptan equivalent weight of 1566, and a viscosity of 140 poise.

Example 3

Polythioether Polymer Synthesis

A resin was prepared in a manner similar to that described in Example 16 of U.S. Pat. No. 4,366,307, with the exception that trimethylolpropane (TMP) was used to replace HDT (1,5,13-trihydroxy-7-oxa-dithiatridecane) that was synthesized in Example 3 of U.S. Pat. No. 4,366,307. The resulting polymer (theoretical functionality: 2.75) had a mercaptan equivalent weight of 1704, and a viscosity of 400 poise.

Example 4

Curing of Polymer Example 1 with DEG-DVE

The curing reaction was performed in a 100 g plastic container with a lid. The polymer described in Example 1 (50.00 g, 0.03 equivalent mole) and diethylene glycol divinyl ether (DEG-DVE) (2.40 g, 0.03 equivalent mole) were added to the 100 g container. The container was placed in a high speed mixer (DAC 600 FVZ) and mixed for 1 minute at 2300 rpm. The container was opened and Irgacure® 2022 (A Bis Acyl Phosphine/α-hydroxyketone photoinitiator from BASF Corporation, 0.54 g, 1% by weight) was added, and the container was closed and placed in the mixer and mixed for 30 seconds at 2,300 rpm.

The polymer was poured over a circular (5 inches in diameter) metal lid (pre-treated with Valspar® Mold Release 225), and placed under UV light for 15 seconds, after which time the polymer had completely cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 J UV energy, measured by a UV power puck, available from EIT Inc. of Sterling, Va., was applied to the polymer composition. Up to 2 inches of cured polymer was obtained. The hardness of the polymer was measured with a Durometer to be 20 Shore A. The polymer was cut into six, ½ inch dog bones with a tensile strength gauge, and three of the specimens were used to measure dry (no water or fuel immersion) tensile strength and elongation, using an Instron. The results (an average of the three) are as follows: 250 psi (tensile strength), and 1011% (elongation). One of the ½ inch dog bones was cut in half and placed in 20 mL vial with lid and placed in a 200° F. (93° C.) oven. The sample was kept at 200° F. (93° C.) for 2 days, after which time the hardness was checked to be 10 Shore A. Tensile strength and elongation data were obtained according to ASTM D 412 and hardness data was obtained according to ASTM D 2240.

Example 5

Curing of a Blend of Polymer Example 1 and Polymer Example 2 with DEG-DVE

The curing reaction was performed in a 300 g plastic container with a lid. The polymer described in Example 1 (120.00 g, 0.07 equivalent mole), the polymer described in Example 2 (30.00 g, 0.02 equivalent mole), and diethylene glycol divinyl ether (DEG-DVE) (7.25 g, 0.09 equivalent mole) were added to the 300 g container. The container was placed in a mixer (DAC 600 FVZ) and mixed for 1 minute at 2300 rpm. The container was opened and Irgacure® 2022 (0.79 g, 0.5% by weight) was added, and the container was closed and placed in the mixer and mixed for 30 seconds at 2300 rpm. The polymer was equally distributed among 3 circular (5 inches in diameter) metal lids (pre-treated with Valspar® Mold Release 225), and placed under UV light for 15 seconds, after which time the polymer had completely cured. Curing was achieved using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT Inc. of Sterling, Va., was applied to the polymer composition. Up to 2 inches of cured polymer was obtained. The hardness of the polymer was measured with a durometer to be 22 Shore A.

The polymer was cut into twenty-one, ½ inch dog bones with a tensile strength gauge. Dry tensile strength and elongation were measured, for 3 of the specimens using an Instron. The results (an average of the three) are as follows: 258 psi (tensile strength), and 625% (elongation). Three of the ½ inch dog bones were placed in a glass jar, with a lid, and covered with jet reference fuel (JRF Type I) and placed in a 140° F. (60° C.) water bath for 7 days. The results (an average of the three) are as follows: 287 psi (tensile strength) and 755% (elongation). Three more of the dog bones were placed in glass jar with lid, covered with tap water, and placed in a 95° F. (35° C.) oven. The samples were kept in the 95° F. (35° C.) oven for 41 days. The results (an average of the three) are as follows: 19 Shore A (hardness), 191 psi (tensile strength), and 713% (elongation). Three additional samples were taken used for 3% salt water immersion test. The samples were placed in glass jar with lid, placed in a 140° F. (60° C.) oven for 4.5 days. The results (an average of the three) are as follows: 20 A (hardness), 224 psi (tensile strength), and 765% (elongation). Tensile strength and elongation data were obtained according to ASTM D 412 and hardness data was obtained according to ASTM D 2240.

Example 6

Curing of Blend of Example 1 and Example 2 with TEG-DVE

The curing reaction was performed in a 100 g plastic container with a lid. The polymer described in Example 1 (40.80 g, 0.02 equivalent mole), the polymer described in Example 2 (10.20 g, 0.01 equivalent mole), and triethylene glycol divinyl ether (TEG-DVE) (3.15 g, 0.03 equivalent mole) were added to the 100 g container. The container was placed in a mixer (DAC 600 FVZ) and mixed for 1 minute at 2300 rpm. The container was opened and Irgacure® 2022 (0.26 g, 0.5% by weight) was added, and the container was placed in the speed mixer again and mixed for 30 seconds at 2300 rpm.

The polymer was poured over a circular (5 inches in diameter) metal lid (pre-treated with Valspar® Mold Release 225), and placed under UV light for 15 seconds, after which time the polymer had completely cured. Curing was achieved using a Super Six curing unit, available from Fusion Systems Inc. The curing unit was equipped with a 300 W H-bulb, which produced UV wavelengths ranging from 200 nm to 450 nm. A total dosage of 3.103 $J/cm^2$ UV energy, measured by a UV power puck, available from EIT Inc. of Sterling, Va., was applied to the polymer composition. Up to 2 inches of cured polymer was obtained. The hardness of the polymer was measured with a durometer to be 22 Shore A. The polymer was cut into six, ½ inch dog bones with a tensile strength gauge. Dry tensile strength and elongation were measured for three of the specimens using an Instron. The results (an average of the three) are as follows: 182 psi (tensile strength) and 660% (elongation). Three of the ½ inch dog bones were placed in a glass jar, with a lid, and covered with jet reference fuel (JRF Type I) and placed in a 140° F. (60° C.) water bath for 7 days. The results (an average of the three) are as follows: 248 psi (tensile strength), 658% (elongation). Tensile strength and elongation data were obtained according to ASTM D 412 and hardness data was obtained according to ASTM D 2240.

Example 7

Curing of Polymer Example 3 with DEG-DVE

The curing reaction was performed in a 100 g plastic container with a lid. The polymer described in Example 3 (50.00 g, 0.03 equivalent mole) and diethylene glycol divinyl ether (DEG-DVE) (2.32 g, 0.03 equivalent mole) were added to the 100 g container. The container was placed in a mixer (DAC 600 FVZ) and mixed for 1 minute at 2300 rpm. The container was opened and Irgacure® 2022 (0.52 g, 1% by weight) was added, and the container was closed and placed in the mixer and mixed for 30 seconds at 2300 rpm. The polymer was poured over a circular (5 inches in diameter) metal lid (pre-treated with Valspar® Mold Release 225), and placed under UV light for 15 seconds, after which time the polymer had completely cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 $J/cm^2$ UV energy, measured by a UV power puck, available from EIT Inc. of Sterling, Va., was applied to the polymer composition. Up to ¼ inches of cured polymer was obtained. The hardness of the polymer was measured with a durometer to be 18 Shore A. The polymer was cut into six, ½ inch dog bones with tensile strength gauge, and three of the specimens were used to measure dry (no water or fuel immersion) tensile strength and elongation, using an Instron. The results (an average of the three) are as follows: 81 psi (tensile strength), and 166% (elongation). Tensile strength and elongation data were obtained according to ASTM D 412 and hardness data was obtained according to ASTM D 2240.

Example 8

Sealant Composition Using Polymer Example 1

A sealant composition was prepared by mixing the polymer described in Example 1 with diethylene glycol divinyl ether (DEG-DVE) and other ingredients described in Table 1.

TABLE 1

| Component | Charge Weight, gms |
|---|---|
| Polymer from Example 1 | 300.00 |
| DEG-DVE | 14.46 |
| 3-Mercaptopropyltrimethoxysilane | 1.59 |
| Silica | 31.47 |
| Calcium carbonate | 9.45 |
| Irgacure ® 2022 | 0.81 |

All ingredients described in Table 1 were intimately mixed. A portion of the sealant composition was poured into a 2 inch diameter plastic cup and cured for 15 seconds using a Super Six curing unit, available from Fusion Systems Inc. The curing unit was equipped with a 300 W H-bulb, which produced UV wavelengths ranging from 200 nm to 450 nm. A total dosage of 3.103 $J/cm^2$ UV energy, measured by a UV power puck, available from EIT Inc. of Sterling, Va., was applied to the sealant composition. Up to 1.5 inches of cured sealant was obtained.

Another portion of the sealant composition was poured between two polyethylene sheets, pressed into a ⅛ inch thick sheet using a hydraulic press, and cured using the same curing unit described previously. A ⅛ inch thick flat sheet of cured sealant was obtained for tensile strength, elongation, tear strength and hardness measurement. The data are shown in Table 4.

Example 9

Sealant Composition Using Polymer Examples 1 and 2

A sealant was prepared by mixing polymer described in Example 1 and Example 2 with triethylene glycol divinyl ether (TEG-DVE) and other ingredients described in Table 2.

TABLE 2

| Component | Charge Weight, gms |
|---|---|
| Polymer from Example 1 | 240.00 |
| Polymer from Example 2 | 60.00 |
| TEG-DVE | 18.60 |
| 3-Mercaptopropyltrimethoxysilane | 1.59 |
| Silica | 31.83 |
| Calcium carbonate | 9.54 |
| Irgacure ® 2022 | 0.81 |

All ingredients described in Table 2 were intimately mixed. A portion of the sealant composition was poured into a 2 inch diameter paper cup and cured for 15 seconds using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT Inc. of Sterling, Va., was applied to the sealant composition. Up to 1.5 inches of cured sealant was obtained.

Another portion of the sealant composition was poured between two polyethylene sheets, pressed into a ⅛ inch thick sheet using a hydraulic press, and cured using the same curing unit described previously. A ⅛ inch thick flat sheet of cured sealant was obtained for tensile strength, elongation, tear strength and hardness measurement. The data are shown in Table 4.

Example 10

Sealant Composition Using Polymer Example 3

A sealant was prepared by mixing polymer described in Example 3 with diethylene glycol divinyl ether (DEG-DVE) and other ingredients described in Table 3.

TABLE 3

| Component | Charge Weight, gms |
|---|---|
| Polymer from Example 3 | 150.00 |
| DEG-DVE | 6.96 |
| Fumed Silica | 15.70 |
| Calcium carbonate | 4.71 |
| Irgacure ® 2022 | 0.24 |

All ingredients described in Table 3 were intimately mixed. A portion of the sealant composition was poured into a 2 inch diameter paper cup and cured for 15 seconds using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT Inc. of Sterling, Va., was applied to the sealant composition. Up to ¼ inches of cured sealant was obtained.

Another portion of the sealant composition was poured between two polyethylene sheets, pressed into a ⅛ inch thick sheet using a hydraulic press, and cured using the same curing unit described previously. A ⅛ inch thick flat sheet of cured sealant was obtained for tensile strength, elongation, tear strength and hardness measurement. The data are shown in Table 3.

Example 11

Comparative Example

The curing reaction was performed in a 400 g plastic container with a lid. The polymer described in Example 1 (162.00 g, 0.10 equivalent mole) and trimethylolpropane triacrylate (10.00 g, 0.10 equivalent mole) were added to the 400 g. The container was placed in a mixer (DAC 600 FVZ) and mixed for 1 minute at 2300 rpm. The container was opened and Irgacure® 2022 (1.72 g, 1% by weight) was added, and the container was closed and placed in the mixer and mixed for 30 seconds at 2300 rpm. The polymer composition was placed under UV light for 15 seconds for curing. The curing was achieved by using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT Inc. of Sterling, Va., was applied to the polymer composition. Under such a curing condition, the polymer composition did not form a solid elastomer, rather it gelled. No measurable hardness, tensile strength, and elongation were obtained.

TABLE 4

| Sealant Composition | Tensile Strength, psi | Elongation % | Tear Strength pli | Hardness Shore A |
|---|---|---|---|---|
| Example 8 | 367 | 738 | 44 | 35 |
| Example 9 | 348 | 720 | 56 | 40 |
| Example 10 | 270 | 279 | 36 | 40 |
| Example 11 | n/a* | n/a* | n/a* | n/a* |

*not measurable because a solid elastomer was not formed.

Example 12

Synthesis of Sulfur-Containing Ethylenically Unsaturated Silane

In a 1-liter 4-necked round bottom flask fitted with stirrer, nitrogen inlet, and thermal probe, TAC (121.00 g, 0.49 mole) and γ-mercaptopropyltrimethoxysilane (Silquest® 189, 95.25 g, 0.49 mole) were added at room temperature (25° C., 77° F.). Upon addition there was small exotherm to 40° C. (104° F.). The reaction was slowly heated to 70° C. (158° F.). After the temperature reached 70° C. (158° F.), Vazo®-67 (0.026 g, 0.012% by weight) was added and the reaction was monitored by mercaptan titration (mercaptan titration indicating a mercaptan equivalent of greater 50,000 marked the end of the reaction). At a mercaptan equivalent of 6100, Vazo® 67 (0.042 g, 0.019% by weight) was added and the reaction was allowed to stir at 70° C. (158° F.) while monitored. At mercaptan equivalent of 16,335, Vazo®-67 (0.036 g, 1.7%) was added. At mercaptan equivalent of 39,942 Vazo®-67 (0.016 g, 0.007%) was added. At a mercaptan equivalent of 61,425 the reaction was considered complete and stopped.

Example 13

Curing Polythioether Polymer with DEG-DVE/Adduct Blend

The curing reaction was performed in a 300 g plastic container with a lid. The polymer of Example 1 (120.00 g, 0.07 equivalent mole), DEG-DVE (4.28 g, 0.05 equivalent mole), and the adduct described in Example 12 (4.03 g, 0.02 equivalent mole) were added to a 300 g container. The container was placed in a mixer (DAC 600 FVZ) and mixed for 30 seconds for 2300 rpm. The container was opened and Irgacure® 2022 (0.64 g, 0.5% by weight) was added, and the container was placed in the mixer and mixed for 1 minute at 2300 rpm.

The polymer was poured over circular (5 inches in diameter) metal lid (pre-treated with Valspar® Mold Release 225), and placed under UV light for 15 seconds, after which time the polymer appeared to have cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT Inc. of Sterling, Va., was applied to the polymer composition. Up to 2 inches of cured polymer was obtained. The polymer was left at ambient temperature for 4 days to ensure that it had fully cured. The hardness of the polymer, measured by a durometer was 31 Shore A. The polymer was cut into seven, ½ inch dog bones with a tensile strength gauge. Dry tensile strength and elongation were measured for three of the specimens. The results (an average of the three) are as follows: 282 psi (tensile strength) and 421% (elongation). Two of the ½ inch dog bones were placed in a glass jar, with a lid, and covered with jet reference fuel (JRF Type I) and placed in a 140° F. (60° C.) water bath for 7 days. The results (an average of the two) were as follows: 141 psi (tensile strength), 78% (elongation). Two of the ½ inch dog bones were placed in a glass jar, with lid, covered with tap water and placed in a 200° F. (93° C.) oven for 2 days. The results (an average of two) were as follows: 36 Shore A (hardness), 134 psi (tensile strength), and 50% (elongation). Tensile strength and elongation data were obtained according to ASTM D 412 and hardness data was obtained according to ASTM D 2240.

A portion of the polymer composition was spread onto a 3 inch×6 inch AMS-C-27725 coated aluminum panel and cured according the curing method described previously. An approximately ⅛ inch thick cured polymer film was obtained. The film was further cut into two one-inch strips and the strips were pulled back at 180 degree angles with hands. The percent of adhesion to the substrate was recorded and the results were shown in Table 7.

Example 14

Curing Polythioether Polymer with DEG-DVE/Adduct Blend

The curing reaction was performed in a 300 g plastic container with a lid. The polymer described in Example 1 (120.00 g, 0.073 equivalent mole), DEG-DVE (5.20 g, 0.066 equivalent mole), and the adduct described in Example 12 (1.60 g, 0.007 equivalent mole) were added to the 300 g container. The container was placed in a mixer (DAC 600 FVZ) and mixed for 30 seconds for 2300 rpm. The container was opened and Irgacure® 2022 (0.63 g, 0.5% by weight) was added, and the container was placed in the mixer and mixed for 1 minute at 2,300 rpm.

The polymer was poured over circular (5 inches in diameter) metal lid (pre-treated with Valspar® Mold Release 225), and placed under UV light for 15 seconds, after which time the polymer appeared to have cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT Inc. of Sterling, Va., was applied to the polymer composition. Up to 2 inches of cured polymer was obtained. The polymer was left at ambient temperature for 4 days to insure that it had fully cured. The hardness of the polymer, measured by a durometer was 30 Shore A. The polymer was cut into seven, ½ inch dog bones with a tensile strength gauge. Dry tensile and elongation were measured for three of the specimens. The results (an average of the three) were as follows: 251 psi (tensile strength) and 559% (elongation). Two of the ½ inch dog bones were placed in a glass jar, with a lid, and covered with jet reference fuel (JRF Type I) and placed in a 140° F. (60° C.) water bath for 7 days. The results (an average of the two) were as follows: 202 psi (tensile strength), 351% (elongation). Two of the ½ inch dog bones were placed in a glass jar, with lid, covered with tap water and placed in a 200° F. (93° C.) oven for 2 days. The results (an average of two) were as follows: 25 Shore A (hardness), 204 psi (tensile strength), and 274% (elongation). Tensile strength and elongation data were obtained according to ASTM D 412 and hardness data was obtained according to ASTM D 2240.

A portion of the polymer composition was spread onto a 3 inch×6 inch AMS-C-27725 coated aluminum panel and cured according the method described previously. An approximately ⅛ inch thick cured polymer film was obtained. The film was further cut into two one-inch strips and the strips were pulled back at 180 degree angles with hands. The percent of adhesion to the substrate was recorded and the results were shown in Table 7.

Example 15

Sealant Composition

A sealant composition was prepared by mixing the polymer described in Example 1 and the adduct prepared according to Example 12 with triethylene glycol divinyl ether (TEG-DVE) and other ingredients described in Table 5.

TABLE 5

| Component | Charge Weight, gms |
| --- | --- |
| Polymer from Example 1 | 300.00 |
| TEG-DVE | 12.84 |
| Adduct from Example 12 | 4.02 |
| Calcium carbonate | 9.39 |
| Irgacure ® 2022 | 1.62 |

All ingredients described in Table 5 were intimately mixed. A portion of the sealant composition was poured into a 2 inch diameter paper cup and cured for 15 seconds using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT Inc. of Sterling, Va., was applied to the sealant composition. Up to 1.5 inches of cured sealant was obtained.

A portion of the polymer composition was spread onto a 3 inch×6 inch AMS-C-27725 coated aluminum panel and cured according the method described previously. An approximately ⅛ inch thick cured polymer film was obtained. The film was further cut into two one-inch strips and the strips were pulled back at 180 degree angles with hands. The percent of adhesion to the substrate was recorded and the results were shown in Table 7.

Example 16

Curing Polythioether Polymer without Adduct

The curing reaction was performed in a 100 g plastic container with a lid. The polymer described in Example 1 (50.00 g, 0.03 equivalent mole) and diethylene glycol divinyl ether (DEG-DVE) (2.0 g, 0.03 equivalent mole) were added to the 100 g container. The container was placed in a high speed mixer (DAC 600 FVZ) and mixed for 1 minute at 2300 rpm. The container was opened and Irgacure® 2022

(0.54 g, 1% by weight) was added, and the container was closed and placed in the mixer and mixed for 30 seconds at 2300 rpm.

The polymer was poured over a circular (5 inches in diameter) metal lid (pre-treated with Valspar® Mold Release 225), and placed under UV light for 15 seconds, after which time the polymer had completely cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT Inc. of Sterling, Va., was applied to the polymer composition. Up to 2 inches of cured polymer was obtained. The hardness of the polymer was measured with a Durometer to be 20 Shore A. The polymer was cut into six, ½ inch dog bones with a tensile strength gauge, and 3 of the specimens were used to measure dry (no water or fuel immersion) tensile strength and elongation, using an Instron. The results (an average of the three) are as follows: 250 psi (tensile strength), and 1011% (elongation). One of the ½ inch dog bone was cut in half and placed in 20 mL vial with lid and placed in a 200° F. (93° C.) oven. The sample was kept at 200° F. (93° C.) for 2 days after which time the hardness was checked to be 10 Shore A.

A portion of the polymer composition was spread onto a 3 inch×6 inch AMS-C-27725 coated aluminum panel and cured according the method described previously. An approximately ⅛ inch thick cured polymer film was obtained. The film was further cut into two one-inch strips and the strips were pulled back at 180 degree angles with hands. The percent of adhesion to the substrate was recorded and the results are shown in Table 7.

Example 17

A sealant was prepared by mixing the polymer described in Example 1 and the polymer described in Example 2 with diethylene glycol divinyl ether (DEG-DVE) and other ingredients described in Table 6.

TABLE 6

| Component | Charge Weight, gm |
|---|---|
| Polymer from Example 1 | 240.00 |
| Polymer from Example 2 | 60.00 |
| DEG-DVE | 14.28 |
| Silquest ® A-189* | 0.77 |
| Water | 0.16 |
| Calcium carbonate | 9.33 |
| Irgacure ® 2022 | 1.62 |

*Available from Momentive Performance Matrerials, Inc.

All ingredients described in Table 6 were mixed. A portion of the sealant composition was poured into a 2 inch diameter paper cup and cured for 15 seconds using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT Inc. of Sterling, Va. was applied to the sealant composition. Up to 1.5 inches of cured sealant was obtained.

A portion of the polymer composition was spread onto a 3 inch×6 inch AMS-C-27725 coated aluminum panel and cured according the method described previously. An approximately ⅛ inch thick cured polymer film was obtained. The film was further cut into two one-inch strips and the strips were pulled back at 180 degree angles with hands. The percent of adhesion to the substrate was recorded and the results are shown in Table 7.

TABLE 7

Adhesion of polymer compositions to AMS-C-27725 coated aluminum.

| Composition | Adhesion |
|---|---|
| Example 13 | 100% cohesive |
| Example 14 | 100% cohesive |
| Example 15 | >95% cohesive |
| Example 16 | 0% cohesive |
| Example 17 | <50% cohesive |

Example 18

A sealant composition was prepared having the following constituents:

| Component | Weight (gm) |
|---|---|
| Polymer of Example 1 | 400 |
| Triethylene glycol divinyl ether | 24 |
| Mercaptosilane | 2.1 |
| Laromer ® LR9000 | 0.7 |
| Silica | 42.7 |
| Calcium carbonate | 12.8 |
| Irgacure ® 2022 | 0.16 |

One-quarter-inch thick hardness plugs having a 1.5-inch diameter were prepared using the above composition and fully cured.

Samples were immersed in JRF-1 or a 3% NaCl aqueous solution at 140° F. for up to 6 months.

Figure 2:
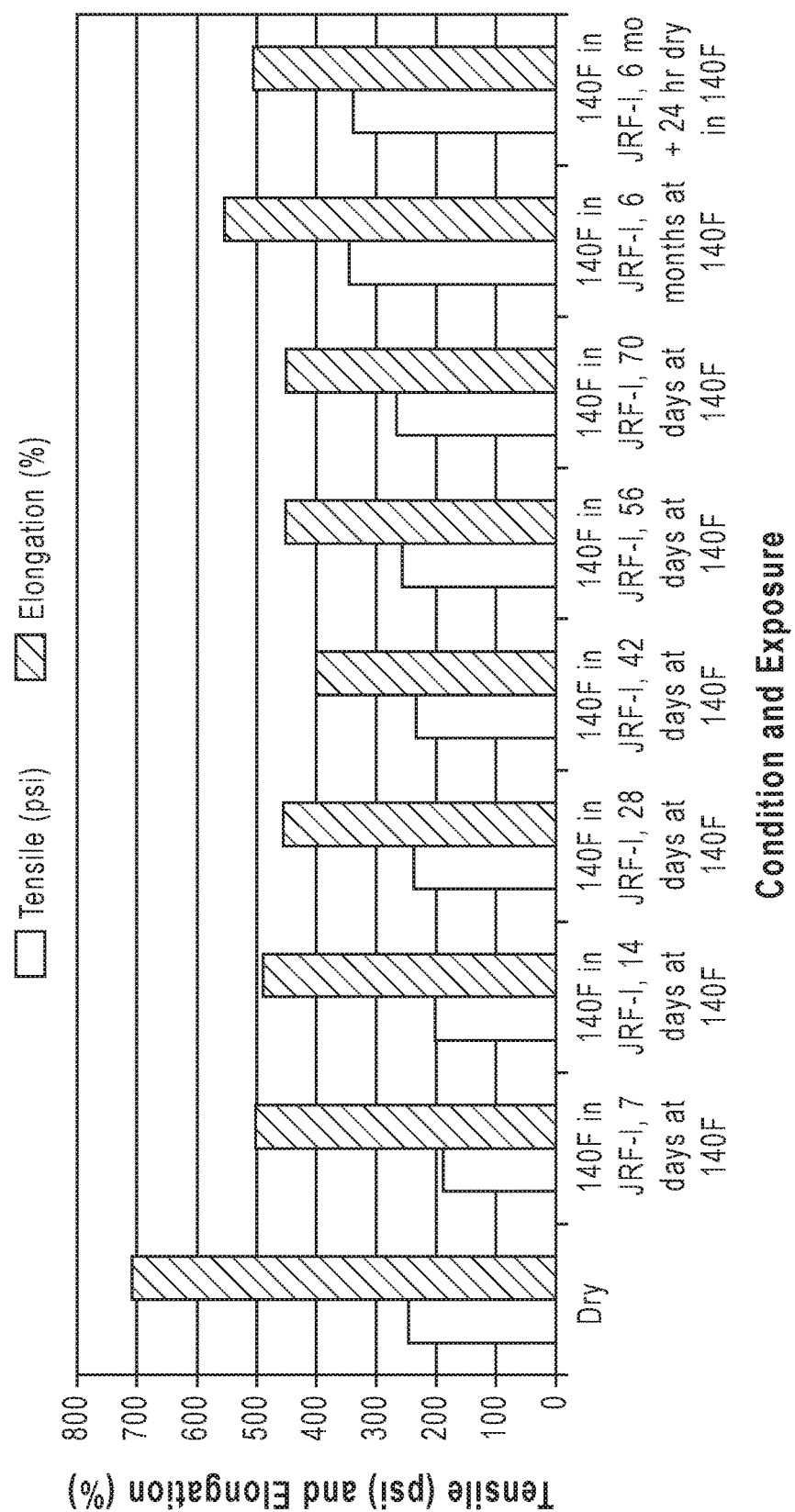
FIG. 2 is a graph showing the tensile strength and elongation of a cured sealant provided by the present disclosure either dry or following immersion in JRF-I.
Figure 3:
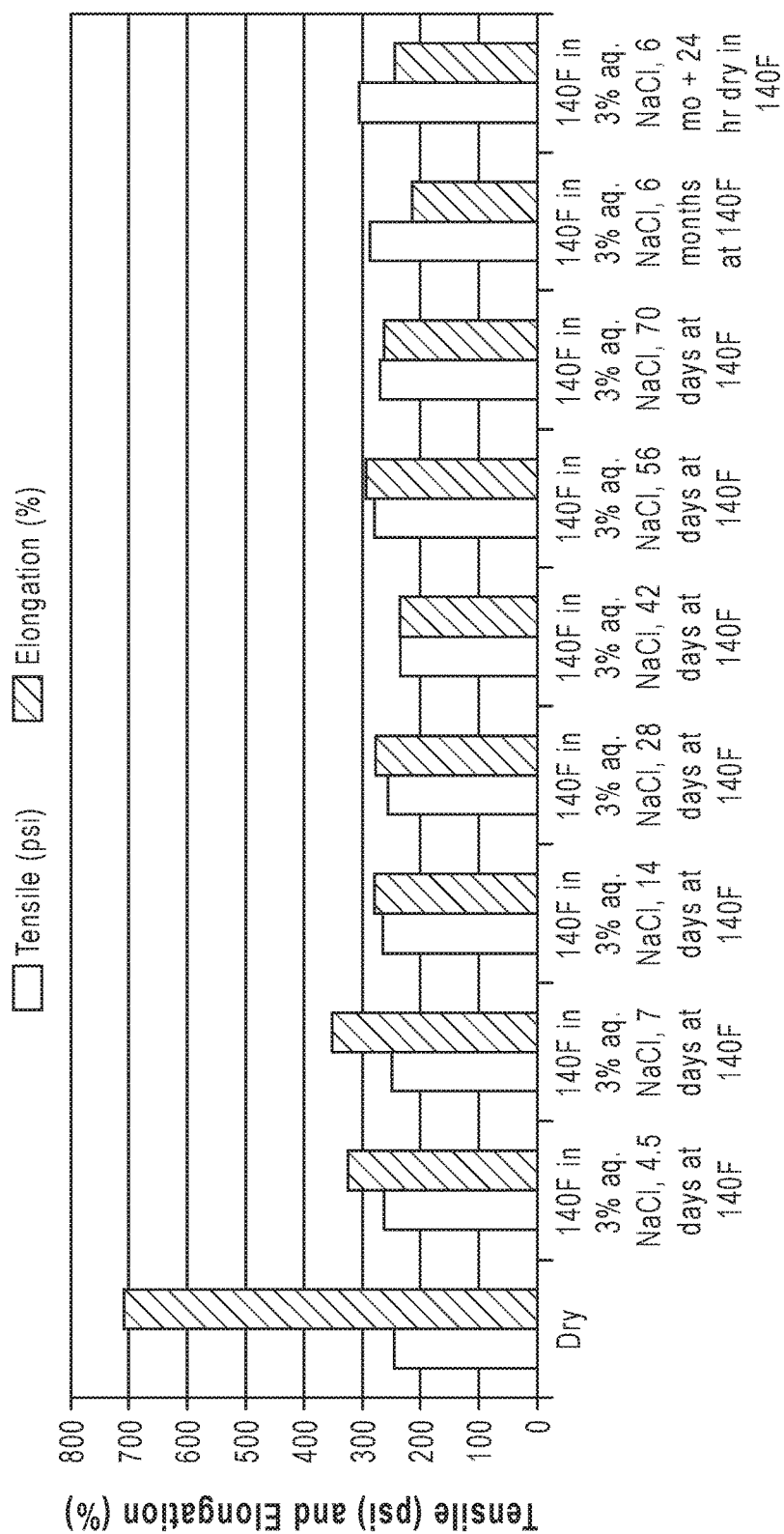
FIG. 3 is a graph showing the tensile strength and elongation of a cured sealant provided by the present disclosure before and after immersion in a 3% NaCl aqueous solution.

The tensile strength and elongation of the samples at various times are shown in FIG. 2 (in JRF-1) and in FIG. 3 (in 3% NaCl).

Figure 4:
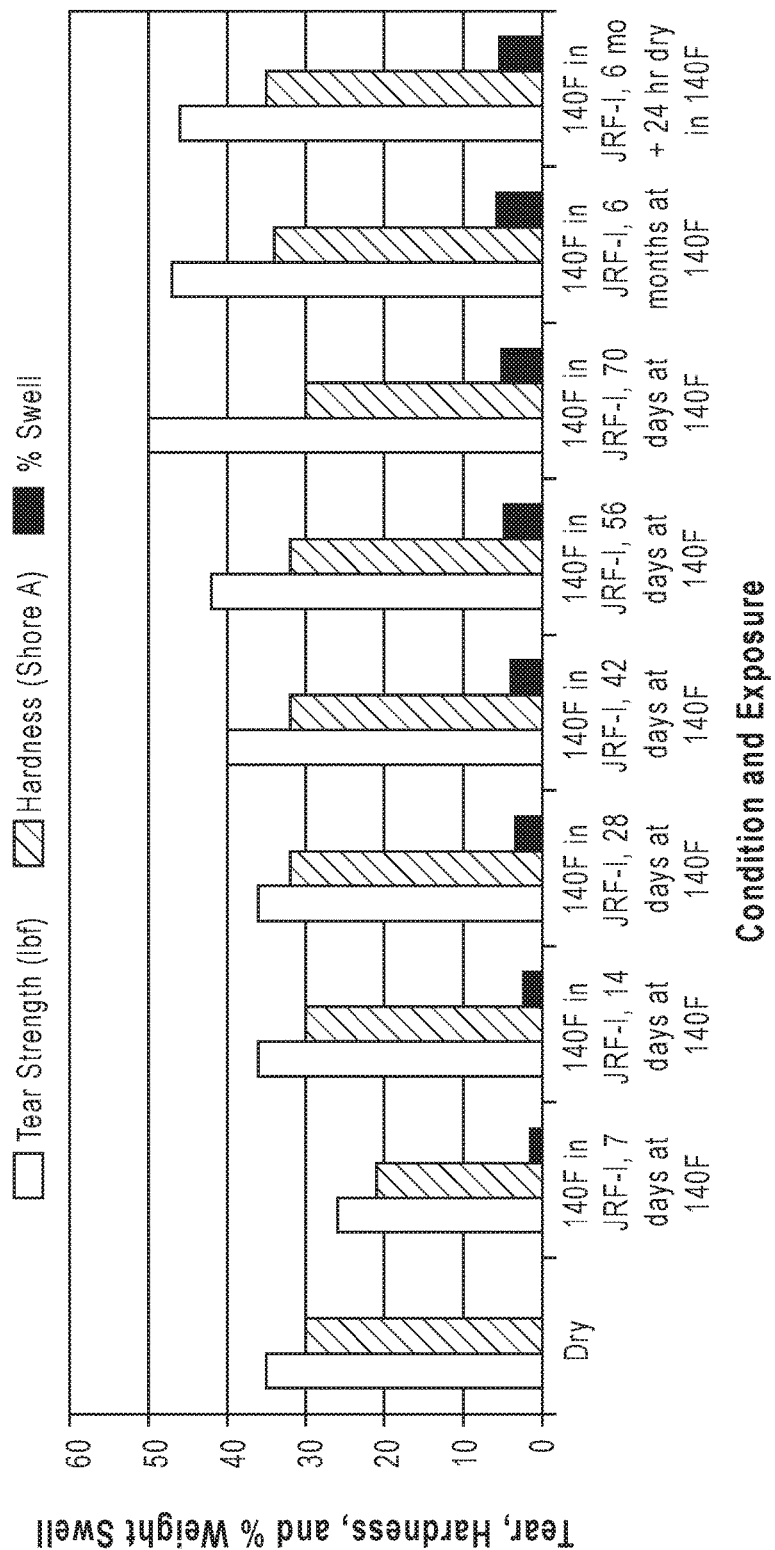
FIG. 4 is a graph showing the tear strength, hardness, and weight percent swell of a cured sealant provided by the present disclosure either dry or following immersion in JRF-I.
Figure 5:
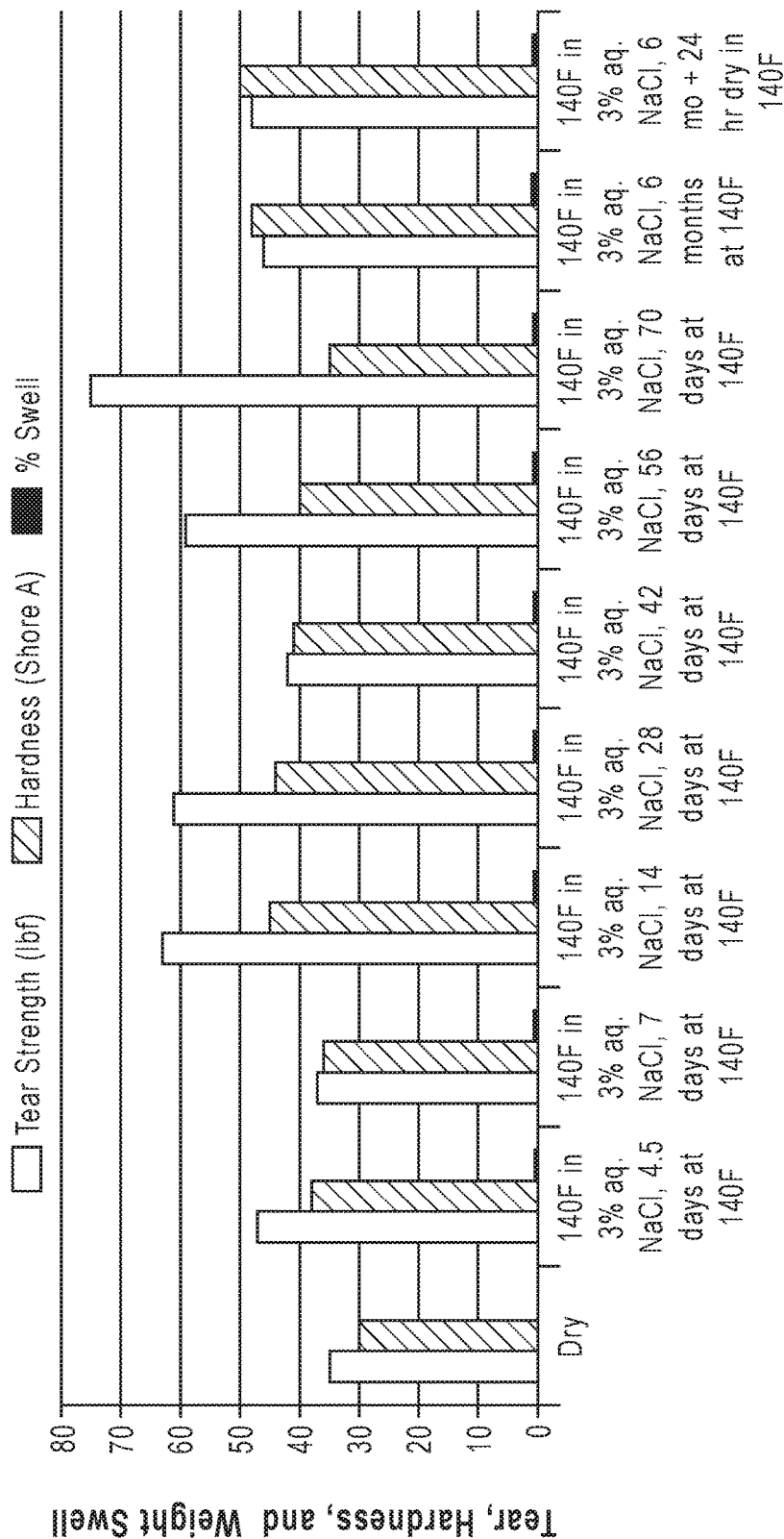
FIG. 5 is a graph showing the tensile strength, hardness, and weight percent swell of a cured sealant provided by the present disclosure either dry or following immersion in a 3% NaCl aqueous solution.

The tear strength, hardness and % swell of the samples at various times are shown in FIG. 4 (in JRF-1) and in FIG. 5 (in 3% NaCl).

Example 19

Figure 6:
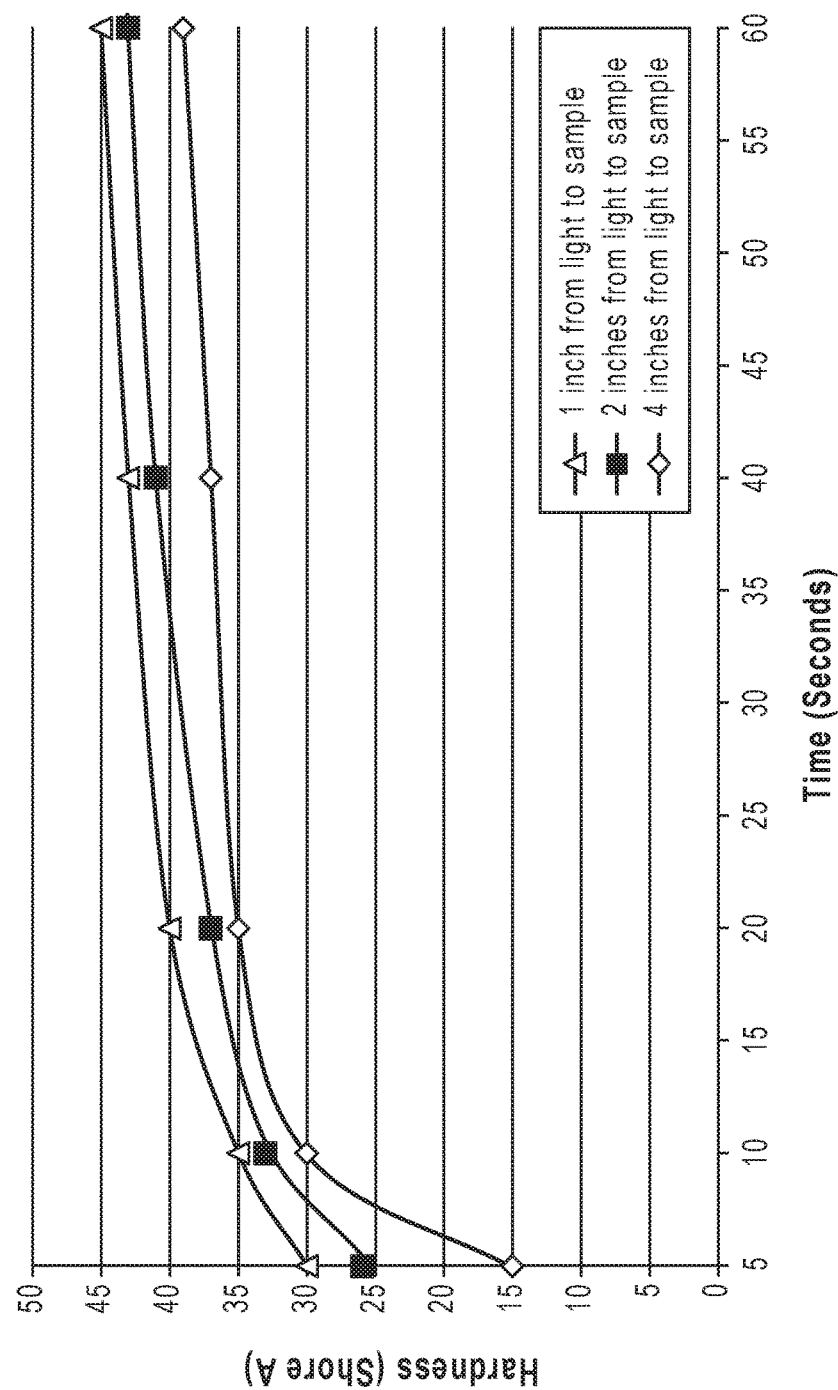
FIG. 6 is a graph showing the hardness (Shore A) of a cured sealant provided by the present disclosure as a function of time and distance of the UV source from the sealant, and without an overlying cured sealant sheet.

Samples prepared according to Example 18 were exposed to UV radiation from a Phoseon Firefly UV source (395 nm, >1000 mW/cm$^2$ setting) at various distances from the sample. The hardness of the sample as a function of cure time at distances of 1 inch, 2 inches, and 4 inches are shown in FIG. 6.

Figure 7:
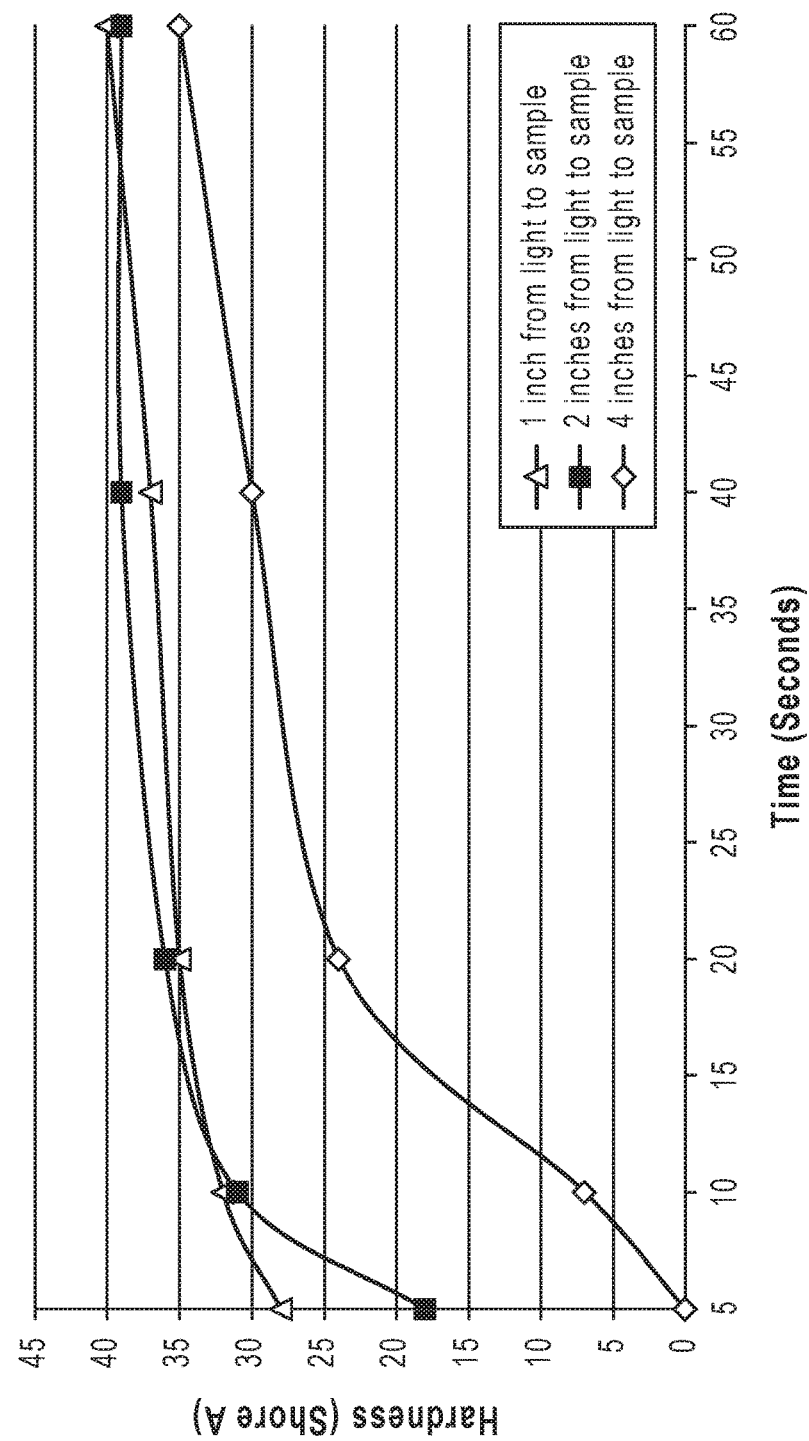
FIG. 7 is a graph showing the hardness (Shore A) of a cured sealant provided by the present disclosure as a function of time and distance of the UV source from the sealant, and with a ¼-inch thick cured sheet of sealant over the sample.

Similar measurements were made with a ¼ inch thick sheet of a cured sample covering the uncured sample prepared according to Example 18, and the hardness as a function of time and distance from the light source are shown in FIG. 7.

Figure 8:
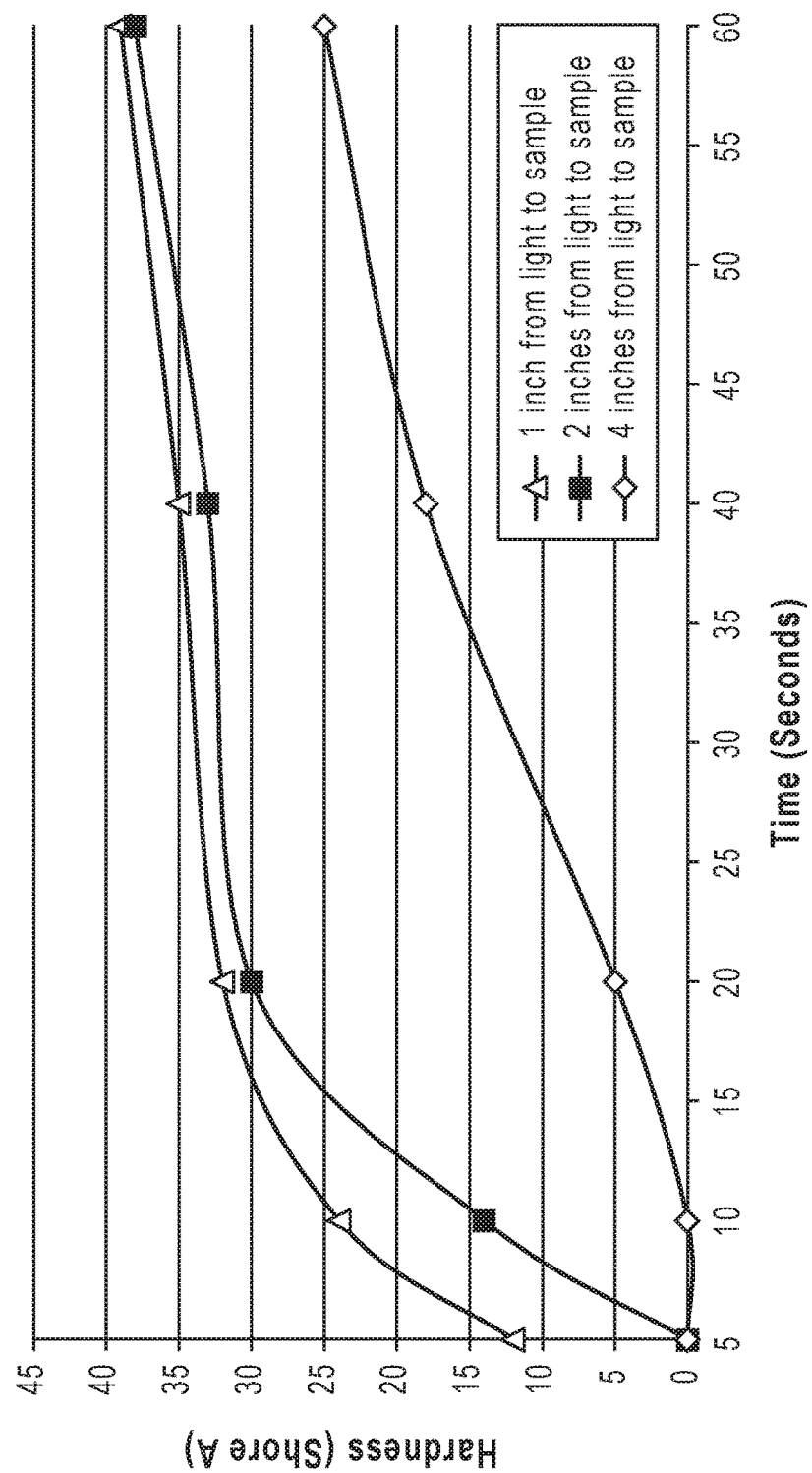
FIG. 8 is a graph showing the hardness (Shore A) of a cured sealant provided by the present disclosure as a function of time and distance of the UV source from the sealant, and with a ½-inch thick cured sheet of sealant over the sample.

Similar measurements were made with a ½ inch thick sheet of a cured sample covering the uncured sample prepared according to Example 18, and the hardness as a function of time and distance from the light source are shown in FIG. 8.

Example 20

Properties relevant to aerospace sealant applications of a typical cured aerospace sealant are compared to those of a UV-curable sealant provided by the present disclosure in Table 8. The properties were determined for a hardness plug (1.5-inches thick; ¼-inch diameter) for a typical aerospace sealant and for the UV curable sealant of Example 18.

TABLE 8

| Property | Typical Sealant | UV-Curable Sealant |
| --- | --- | --- |
| Density | 1.65 to 1.1 grams/cc | 1.1 grams/cc |
| Viscosity | Class B 8000-15000 P | 13000 Poises |
| Hardness | 40 to 60 Shore A | 40 to 50 Shore A |
| (High x-link version) | — | 75 Shore A |
| Lap shear strength | 200 to 400 psi | 200 to 375 psi |
| Peel strength | 20 to 50 piw | 25 to 35 piw |
| Tensile strength | 200 to 400 psi | 250 to 450 psi |
| Elongation | 200 to 350 % | 250 to 500% |
| Low temp flex | Pass −65° F. | Pass −65° F. |

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A seal cap comprising:
a preformed, at least partially cured, first sealant composition forming a shell; and
an at least partially uncured, second sealant composition filling the shell, wherein the first sealant composition and the second sealant composition comprise:
(i) a thiol-terminated polythioether;
(ii) a divinyl ether; and
(iii) a filler, wherein the filler is selected such that the first sealant composition and the second sealant composition are visually clear.

2. The seal cap of claim 1, wherein the first sealant composition is at least partially transmissive to ultraviolet radiation and the second sealant composition is curable by ultraviolet radiation.

3. The seal cap of claim 1, wherein the first sealant composition is fully cured.

4. The seal cap of claim 1, wherein the first sealant composition is curable by ultraviolet radiation.

5. The seal cap of claim 1, wherein the second sealant composition is fully uncured.

6. The seal cap of claim 1, wherein the second sealant composition is curable by ultraviolet radiation.

7. The seal cap of claim 1, wherein the first sealant composition and the second sealant composition comprise the same composition.

8. The seal cap of claim 1, wherein the first sealant composition and the second sealant composition comprise different compositions.

9. The seal cap of claim 1, wherein the thiol-terminated polythioether comprises a structure having the formula:

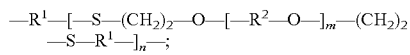

wherein
(1) each $R^1$ independently denotes a $C_{2-10}$ linear alkanediyl group, a $C_{2-6}$ branched alkanediyl group, a $C_{6-8}$ cycloalkanediyl group, a $C_{6-10}$ alkanecycloalkanediyl group, $-[(-CH_2-)_p-X-]_q-(-CH_2-)_r-$ or $-[(-CH_2-)_p-X-]_q-(-CH_2-)_r-$ in which at least one $-CH_2-$ unit is substituted with a $-CH(CH_3)-$ group, wherein:
(i) each X is independently selected from O, S, and $-NR^6-$, wherein $R^6$ is hydrogen or methyl;
(ii) p is an integer having a value ranging from 2 to 6;
(iii) q is an integer having a value ranging from 0 to 5; and
(iv) r is an integer having a value ranging from 2 to 10;
(2) each $R^2$ independently denotes a $C_{2-10}$ linear alkanediyl group, a $C_{2-6}$ branched alkanediyl group, a $C_{6-8}$ cycloalkanediyl group, a $C_{6-10}$ alkanecycloalkanediyl group, or $-[(-CH_2-)_p-X-]_q-(-CH_2-)_r-$, wherein:
(i) each X is independently selected from O, S, and $-NR^6-$, wherein $R^6$ is hydrogen or methyl;
(ii) p is an integer having a value ranging from 2 to 6;
(iii) q is an integer having a value ranging from 0 to 5; and
(iv) r is an integer having a value ranging from 2 to 10;
(3) m is a rational number from 0 to 10; and
(4) n is an integer having a value ranging from 1 to 60.

10. The seal cap of claim 1, wherein the thiol-terminated polythioether comprises a thiol-terminated polythioether having the structure of the formula:

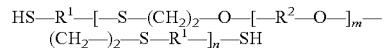

wherein
(1) each $R^1$ independently denotes a $C_{2-10}$ linear alkanediyl group, a $C_{2-6}$ branched alkanediyl group, a $C_{6-8}$ cycloalkanediyl group, a $C_{6-10}$ alkanecycloalkanediyl group, $-[(-CH_2-)_p-X-]_q-(-CH_2-)_r-$ or $-[(-CH_2-)_p-X-]_q-(-CH_2-)_r-$ in which at least one $-CH_2-$ unit is substituted with a $-CH(CH_3)-$ group, wherein:
(i) each X is independently selected from O, S, and $-NR^6-$, wherein $R^6$ is hydrogen or methyl;
(ii) p is an integer having a value ranging from 2 to 6;
(iii) q is an integer having a value ranging from 0 to 5; and
(iv) r is an integer having a value ranging from 2 to 10;
(2) each $R^2$ independently denotes a $C_{2-10}$ linear alkanediyl group, a $C_{2-6}$ branched alkanediyl group, a $C_{6-8}$ cycloalkanediyl group, a $C_{6-10}$ alkanecycloalkanediyl group, or $-[(-CH_2-)_p-X-]_q-(-CH_2-)_r-$, wherein:
(i) each X is independently selected from O, S, and $-NR^6-$, wherein $R^6$ is hydrogen or methyl;
(ii) p is an integer having a value ranging from 2 to 6;
(iii) q is an integer having a value ranging from 0 to 5; and
(iv) r is an integer having a value ranging from 2 to 10;
(3) m is a rational number from 0 to 10; and
(4) n is an integer having a value ranging from 1 to 60.

11. The seal cap of claim 1, wherein the thiol-terminated polythioether comprises a thiol-terminated polythioether having the structure of the formula: $B-(A-[R^3]_y-SH)_z$ wherein:
(1) A denotes a structure having the formula:

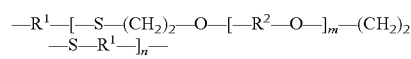

wherein
(I) each $R^1$ independently denotes a $C_{2-10}$ linear alkanediyl group, a $C_{2-6}$ branched alkanediyl group, a $C_{6-8}$ cycloalkanediyl group, a $C_{6-10}$ alkanecycloalkanediyl group, $-[(-CH_2-)_p-X-]_q-(-CH_2-)_r-$ or $-[(-CH_2-)_p-X-]_q-(-CH_2-)_r-$ in which at least one $-CH_2-$ unit is substituted with a $-CH(CH_3)-$ group, wherein:
  (i) each X is independently selected from O, S, and $-NR^6-$, wherein $R^6$ is hydrogen or methyl;
  (ii) p is an integer having a value ranging from 2 to 6;
  (iii) q is an integer having a value ranging from 0 to 5; and
  (iv) r is an integer having a value ranging from 2 to 10;
(II) each $R^2$ independently denotes a $C_{2-10}$ linear alkanediyl group, a $C_{2-6}$ branched alkanediyl group, a $C_{6-8}$ cycloalkanediyl group, a $C_{6-10}$ alkanecycloalkanediyl group, or $-[(-CH_2-)_p-X-]_q-(-CH_2-)_r-$, wherein:
  (i) each X is independently selected from O, S, and $-NR^6-$, wherein $R^6$ is hydrogen or methyl;
  (ii) p is an integer having a value ranging from 2 to 6;
  (iii) q is an integer having a value ranging from 0 to 5; and
  (iv) r is an integer having a value ranging from 2 to 10;
(III) m is a rational number from 0 to 10; and
(IV) n is an integer having a value ranging from 1 to 60;
(2) y is 0 or 1;
(3) $R^3$ denotes a single bond when y=0 and $-S-(CH_2)_2-[-O-R^2-]_m-O-$ when y=1;
(4) z is an integer from 3 to 6; and
(5) B denotes a z-valent residue of a polyfunctionalizing agent.

12. The seal cap of claim 1, wherein the second sealant composition further comprises an ethylenically unsaturated silane.

13. The seal cap of claim 1, wherein the second sealant composition further comprises a photoinitiator.

14. The seal cap of claim 1, wherein the second sealant composition comprises an essentially stoichiometric equivalent amount of thiol groups to alkenyl groups.

15. The seal cap of claim 1, wherein the filler transmits ultraviolet (UV) radiation.

16. The seal cap of claim 1, wherein the filler is selected in part by an index of refraction of the filler.

17. The seal cap of claim 1, wherein the filler comprises fumed silica.

18. The seal cap of claim 1, wherein the filler has a specific gravity from 0.1 to 0.7.

19. The seal cap of claim 1, wherein the filler internally scatters reflected ultraviolet (UV) radiation.

20. A method of sealing a fastener comprising:
applying the seal cap of claim 1 to the fastener; and
exposing the seal cap to ultraviolet radiation to fully cure the second sealant to seal the fastener.

21. A fastener comprising the seal cap of claim 1.

22. A method of smoothing a surface defect comprising:
applying a sealant composition to the surface defect;
smoothing the sealant composition to fill the surface defect;
exposing the smoothed sealant composition to ultraviolet radiation to cure the smoothed sealant composition,
  wherein the sealant composition is UV-curable and comprises:
  (i) a thiol-terminated polythioether; and
  (ii) an alkenyl-terminated compound comprising a divinyl ether.

23. The method of claim 22, wherein the surface defect comprises a surface depression.

24. The method of claim 22, wherein the surface defect comprises a gap between two adjacent panels.

* * * * *